US008457877B2

(12) United States Patent

Kelly et al.

(10) Patent No.: US 8,457,877 B2

(45) Date of Patent: Jun. 4, 2013

(54) DEVICES, SYSTEMS, AND METHODS FOR TESTING CRASH AVOIDANCE TECHNOLOGIES

(75) Inventors: Joseph Kelly, Lakewood, CA (US); Peter Broen, Torrance, CA (US); Jordan Silberling, Redondo Beach, CA (US); Nenad Bozin, San Pedro, CA (US); John Zellner, Rancho Palos Verdes, CA (US)

(73) Assignee: Dynamic Research, Inc., Torrance, CA (US)

( * ) Notice: Subject to any disclaimer, the term of this patent is extended or adjusted under 35 U.S.C. 154(b) by 0 days.

(21) Appl. No.: 13/532,396

(22) Filed: Jun. 25, 2012

(65) Prior Publication Data

US 2013/0016027 A1 Jan. 17, 2013

Related U.S. Application Data

(63) Continuation-in-part of application No. 13/357,526, filed on Jan. 24, 2012.

(60) Provisional application No. 61/507,539, filed on Jul. 13, 2011, provisional application No. 61/578,452, filed on Dec. 21, 2011, provisional application No. 61/621,597, filed on Apr. 9, 2012, provisional application No. 61/639,745, filed on Apr. 27, 2012.

(51) Int. Cl.

| | |
|---|---|
| ***G06F 17/10*** | (2006.01) |
| ***G06G 7/78*** | (2006.01) |
| ***G06G 1/16*** | (2006.01) |

(52) U.S. Cl.

USPC .......................................... 701/301; 343/882

(58) Field of Classification Search

USPC .............. 701/45, 46, 301; 343/702, 709, 711, 343/713, 715, 784, 872, 880, 882, 901, 902, 343/903, 906, 915; 180/268, 9.32

See application file for complete search history.

(56) References Cited

U.S. PATENT DOCUMENTS

| | | | | |
|---|---|---|---|---|
| 4,530,056 A | | 7/1985 | MacKinnon et al. | |
| 5,184,142 A | * | 2/1993 | Hornburg et al. ............. | 343/715 |

(Continued)

OTHER PUBLICATIONS

Zellner et al., "Extension of the Honda-DRI "Safety Impact Methodology" (SIM) for the NHTSA Advanced Crash Avoidance Technology (ACAT) Program and Application to a Prototype Advanced Collision Mitigation Braking System," SAE International, Paper No. 2009-01-0781; pp. 1-21, Apr. 20, 2009.

(Continued)

*Primary Examiner* — Thomas Black

*Assistant Examiner* — Isaac Smith

(74) *Attorney, Agent, or Firm* — Manuel de la Cerra

(57) ABSTRACT

A Guided Soft Target (GST) system and method provides a versatile test system and methodology for the evaluation of various crash avoidance technologies. This system and method can be used to replicate the pre-crash motions of the CP in a wide variety of crash scenarios while minimizing physical risk, all while consistently providing radar and other sensor signatures substantially identical to that of the item being simulated. The GST system in various example embodiments may comprise a soft target vehicle or pedestrian form removably attached to a programmable, autonomously guided, self-propelled Dynamic Motion Element (DME), which may be operated in connection with a wireless computer network operating on a plurality of complimentary communication networks. Specific DME geometries are provided to minimize ride disturbance and observability by radar and other sensors. Computer controlled DME braking systems are disclosed as well as break-away and retractable antenna systems.

20 Claims, 34 Drawing Sheets

U.S. PATENT DOCUMENTS

| | | | |
|---|---|---|---|
| 5,338,206 | A | 8/1994 | Hupfer |
| 5,550,742 | A | 8/1996 | Furuya et al. |
| 5,684,696 | A | 11/1997 | Rao et al. |
| 6,114,985 | A | 9/2000 | Russsell et al. |
| 7,103,704 | B2 | 9/2006 | Chatterjee |
| 7,575,491 | B1 | 8/2009 | Martin |
| 7,617,048 | B2 | 11/2009 | Simon et al. |
| 2005/0155441 | A1 | 7/2005 | Nagata |
| 2010/0087984 | A1 | 4/2010 | Joseph |
| 2010/0109835 | A1 | 5/2010 | Alrabady et al. |
| 2011/0270467 | A1 | 11/2011 | Steffan et al. |

OTHER PUBLICATIONS

Zellner et al., "Extension of the Honda-DRI "Safety Impact Methodology" (SIM) for the NHTSA Advanced Crash Avoidance Technology (ACAT) II Program and Application to the Evaluation of a Pre-Production Head-On Crash Avoidance Assist System—Progress Report", SAE International, Paper No. 2012-01-0291, pp. 1-20, Apr. 16, 2012.

Kelly et al., "Development of a Guided Soft Target for Crash Avoidance Technology Evaluation", SAE International, Paper No. 2011-01-0580, pp. 1-9, Apr. 12, 2011.

* cited by examiner

Example GST System Architecture

DEVICES, SYSTEMS, AND METHODS FOR TESTING CRASH AVOIDANCE TECHNOLOGIES

1.0 CROSS-REFERENCE TO RELATED APPLICATIONS

This application claims priority as a continuation-in-part of U.S. patent application Ser. No. 13/357,526 entitled "System and Method for Testing Crash Avoidance Technologies" filed Jan. 24, 2012 by Joseph Kelly et al, as a non provisional of U.S. Patent Application No. 61/507,539 entitled "Guided Soft Target For Full Scale Advanced Crash Avoidance Technology Testing" filed on Jul. 13, 2011 by Joseph Kelly et al, as a non-provisional of U.S. Patent Application No. 61/578,452 entitled "Guided Soft Target For Full Scale Advanced Crash Avoidance Technology Testing" filed on Dec. 21, 2011 filed by Joseph Kelly et al, as a non-provisional of U.S. Patent Application No. 61/621,597 entitled "Collision Partner, System and Method" filed on Apr. 9, 2012 by Joseph Kelly et al, and as a non-provisional of U.S. Patent Application No. 61/639,745 entitled "Devices, Systems, And Methods For Testing Crash Avoidance Technologies" filed on Apr. 27, 2012 by Joseph Kelly et al. Each of these patent applications is incorporated herein in their entirety.

2.0 TECHNICAL FIELD

The present invention relates to devices, systems, and methods for testing crash avoidance technologies.

3.0 BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-ends, head-ons, crossing paths, and side-swipes. Additionally, the Soft Collision Partner should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

Past attempts to provide a suitable Soft CP include: a balloon car, an example of which is depicted in FIG. 13 (the "balloon car"); a rear-end target specified by the National Highway Traffic Safety Administration (NHTSA); an example of which is depicted in FIG. 14 (the "NHTSA car-rear"); and a cushioned crashed target provided by Anthony Best Dynamics (ABD), an example of which, partially cut away to show internal structure, is depicted in FIG. 15 (the "ABD car"). All these prior designs have limitations. The balloon car is subject to damage, including bursting, when impacted at higher speeds. Additionally, the balloon car tends to exhibit aerodynamic flutter when moving through the air, which can confuse the sensors on the subject vehicle. The NHTSA car-rear can only be used for rear-end collision testing, and due to its unyielding design can cause minor damage to the subject vehicle at higher speeds. The ABD car cannot be driven through or over due to the large drive system 1505 in the middle of the car as shown in FIG. 15. The relatively heavy ABD car must be pushed out of the way during an impact, creating large forces on the subject vehicle at high speeds, and therefore cannot be used for impact speeds over about 50 kilometers per hour. Additionally, prior art Soft CP's have lacked the steering and braking performance of the vehicles they are simulating, limiting their usefulness in generating real-world data.

4.0 SUMMARY

4.1 Guided Soft Target System and Method

A Guided Soft Target (GST) system and method is provided that overcomes these challenges and more by providing a versatile test system and methodology for the evaluation of various crash avoidance technologies. This system and method can be used to replicate the pre-crash motions of the Soft CP in a wide variety of crash scenarios while minimizing physical risk, all while consistently providing an appearance and signature to radar and other sensors substantially identical to that of the item being simulated. The GST system in various example embodiments may comprise a soft target vehicle or pedestrian form removably attached to a programmable, autonomously guided, self-propelled Dynamic Motion Element (DME), which may be operated in connection with a wireless computer network. The Soft Car or Soft Pedestrian is intended to be a realistic representation of a Soft CP for both the driver and the system under evaluation, and the DME serves as a means of conveyance for the Soft Car such that the motions of the Soft CP are realistic. As a fully autonomous vehicle, the GST can coordinate its motions with the subject vehicle during the pre-crash phase such that the initial conditions of the crash phase are replicated from run to run. At the instant that the ACAT or subject vehicle driver begins to respond to the conflict, in certain embodiments the GST can automatically switch to a mode in which its speed and course are no longer coordinated with the position of the subject vehicle, but instead are such that the GST follows a predetermined speed/time/distance trajectory to a target ground-fixed impact point. This enables the analyst to determine the effect of the ACAT system on the subject vehicle's potential impact with, or avoidance of, the GST as it arrives at the target impact point (e.g., the change in such indices as the "resultant relative velocity at minimum distance" (RRVMD), minimum distance (MD), etc.).

The developed car and pedestrian GST system has versatile as well as robust capabilities, and provides test engineers with the flexibility and low test cycle time necessary for development and testing of ACATs. The GST system can replicate virtually any type of collision between the GST and the subject vehicle, including rear-ends, head-ons, crossing paths, sideswipes and pedestrian collisions. The Soft Car or Soft Pedestrian bodies can be constructed with a wide variety of three-dimensional shapes and sizes, allowing the ACAT developer or evaluator to measure the effect of the system across a range of Collision Partners. These Collision Partner soft bodies can be re-used and reassembled quickly (usually within 10 minutes), and the self-propelled-and-guided DME, encased in a hardened, low-profile, drive-over shell, can be quickly repositioned, allowing the test team to evaluate large numbers of different, realistic scenarios with multiple repeats.

The development of a test methodology, based on the GST system, allows for the evaluation of diverse ACATs covering a wide range of crash and pre-crash conflict scenarios, effectively exercising the various modes and operating conditions of the ACAT. The ability to guide and propel a conflict partner on complex trajectories through the time of collision enables the evaluation of not only collision avoidance but also collision mitigation, vehicle-to-vehicle and vehicle-to-infrastructure technologies. Further, the data collected for both the subject vehicle and GST in the course of such evaluations allows detailed analysis of system response and effectiveness, including its effects on collision avoidance (i.e., minimum distance) as well as its effects on collision severity (i.e., closing speed, contact points, relative heading angle) when a collision occurs.

The inventors are unaware of any prior methods or test systems in which both the subject vehicle and Collision Partner move realistically at relatively high speeds up to and through the point of impact, while minimizing physical risk to test personnel and equipment. Further, the specific geometries for the DME that have been found to both increase safety while minimizing the observability of the DME by radar and other sensors are believed to be new and nonobvious. As noted by many researchers, the development of advanced crash avoidance technologies (ACATs) with increased capabilities offers substantial potential for future reductions in vehicle-related collisions, injuries, and fatalities.

4.1 Low-Profile Dynamic Motion Element

Specific geometries for the DME have been discovered that minimize the risk of the DME flipping up and hitting or otherwise damaging or disrupting the ride of typical subject vehicles during impact of the subject vehicles with the GST, all while minimizing the DME's visibility to the subject vehicle's radar and other sensors.

4.2 Soft Collision Partner System and Method

Also provided is a new and improved Soft CP, system and method that provides an inexpensive and easy way to assemble a structure capable of closely simulating the rigid appearance and radar and other sensor signatures of items such as a motor vehicle, a pedestrian, or other object, while providing a safe and easily reusable target for high-speed subject vehicles used to evaluate crash avoidance technologies. Example Soft CP's designed, manufactured and assembled according to the present invention can handle impacts at relative speeds over 110 kilometers per hour without damage to the Soft CP or the subject vehicle. The interlocking internal structure of the present Soft CP's provides sufficient support to make them aerodynamically stable, limiting or eliminating aerodynamic flutter. The present Soft CP's can be easily made to resemble the simulated item from all directions, allowing the subject vehicle to approach from any angle. Instead of remaining in one piece that needs to be pushed out of the way, the present Soft CP's reduce impact forces by breaking apart into separate, light-weight, easily-reassemblable panels. The present Soft CP's may be adapted for use atop low-profile drive systems that are driven-over by the subject vehicle, instead of pushed out of the way by the subject vehicle.

The present Soft CP, system and method can be used in conjunction with a GST system to replicate the pre-crash motions of a person, car, or other item in a wide variety of crash scenarios while minimizing physical risk, all while consistently providing radar and other sensor signatures substantially identical to that of the item being simulated. The presently-disclosed GST systems or any other suitable GST systems may be used in connection with the present Soft CP, system and method.

Other aspects of the invention are disclosed herein as discussed in the following Drawings and Detailed Description.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

6.0 DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

6.1 Definitions

The following acronyms will be used throughout this description: Advanced Crash Avoidance Technologies (ACATs); Guided Soft Target (GST); Dynamic Motion Element (DME); Forward Collision Warning (FCW); Crash Imminent Braking Systems (CIBS); Soft Collision Partner (Soft CP); Resultant Relative Velocity at Minimum Distance (RRVMD); Minimum Distance (MD); Wireless Local Area Network (WLAN); Guidance, Navigation and Control (GNC) computations; Differential GPS (DGPS); Ground Clearance (GC).

6.2 Example Dynamic Motion Elements

The DME 100, examples of which are shown in FIGS. 1-5, is at the heart of the GST system. The DME 100 is a completely self-contained, un-tethered, relatively high-speed, mobile platform for the Soft Collision Partner 600, and which performs all Guidance, Navigation and Control (GNC) computations, and is capable of being driven over by the subject vehicle 650 without damage to itself or the subject vehicle 650.

Positional measurements, which are the primary measurement used in typical GNC computations, are achieved via the on-board DGPS receiver. Other inputs to the GNC computations may include the yaw rate and heading angle, as measured by an electronic compass.

The DME 100 may incorporate a pair of brushless DC motors to drive, for instance, the rear wheel(s) 220, while steering of the front wheel(s) 200 may be accomplished via a brushless DC position control servo, for example. Wheels 200, 220 means the wheel assembly, including the tire or other material that contacts the ground.

Figure 1:
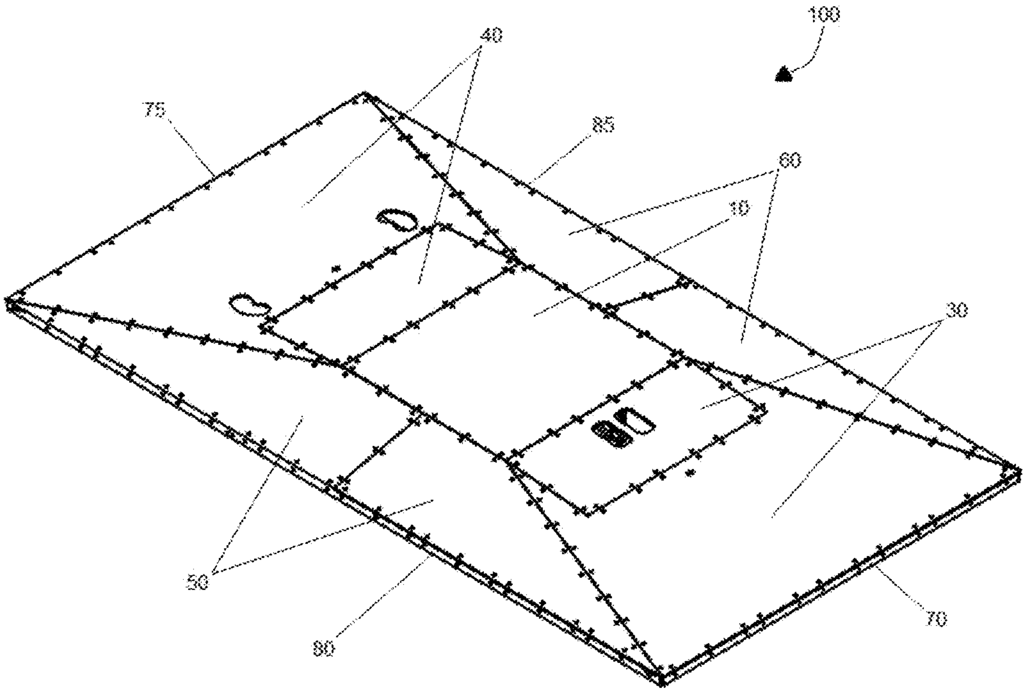
FIG. 1 is a top isometric view of an example DME according to various example embodiments.
Figure 2:
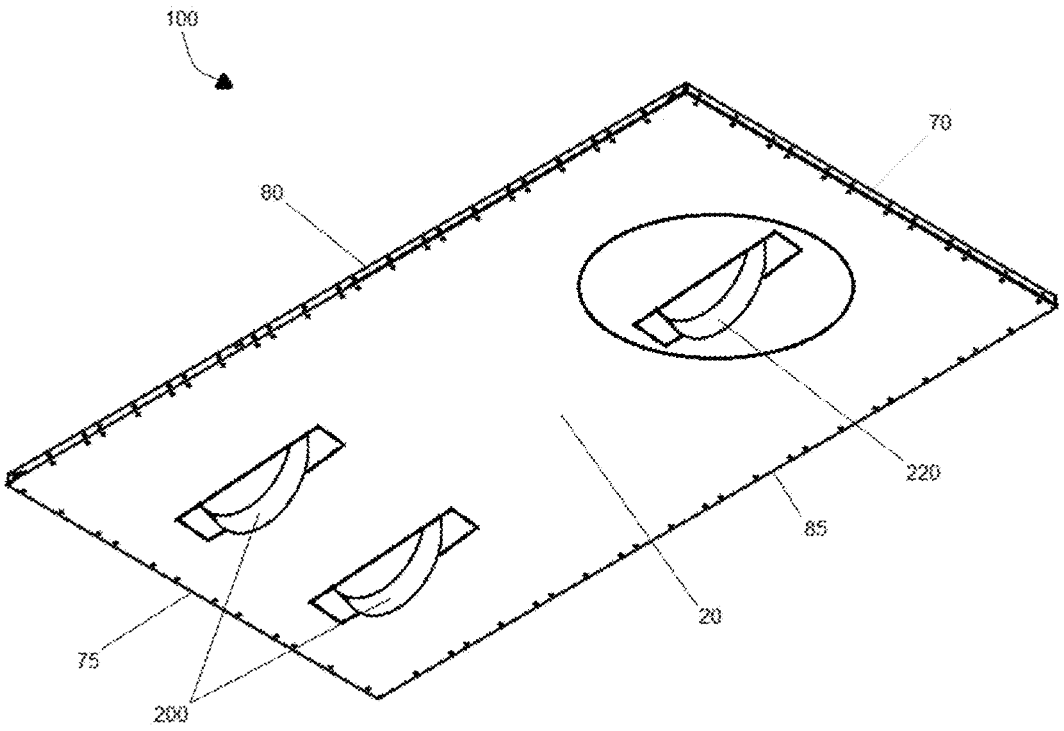
FIG. 2 is a bottom isometric view of the example DME of FIG. 1 according to various example embodiments.

The construction of the DME 100 facilitates mounting, housing and protection of all system components, including for example the computer, sensors, actuators, batteries, and power supplies. The DME 100 may be constructed primarily of aluminum, steel, or any suitably strong material(s), and may utilize an egg-crate, honeycomb, or similar type internal structure (not shown) with exterior armor cladding. With reference to FIG. 1, the DME 100 may include a front side 75, a rear or back side 70, a left side 80 (which would be a driver's side if the DME was an automobile in the U.S.), and a right side 85 (which would be a passenger's side if the DME was an automobile in the U.S.). The exterior armor cladding may comprise a top surface 10 and a bottom surface 20 (shown in FIG. 2), a front upper surface 40, a rear upper surface 30, a left side upper surface 50, and a right side upper surface 60. Other or fewer surfaces may be employed in various other embodiments. As shown in FIG. 2, wheels may extend downward below bottom surface 20. In one example embodiment, wheels may comprise one or more non-steered wheels 220 and one or more steered wheels 200. Any or all of the wheels may be steered, and any or all of the wheels may be driven. In one example embodiment discussed herein, the rear wheels 220 (which may comprise two wheels adjacent to each other) are driven and the front wheels 200 are steered, that is, at least partially rotatable about a substantially vertical axis (i.e., an axis substantially perpendicular to bottom surface 20).

6.3 Examples of Low-Profile Dynamic Motion Elements

Figure 3:
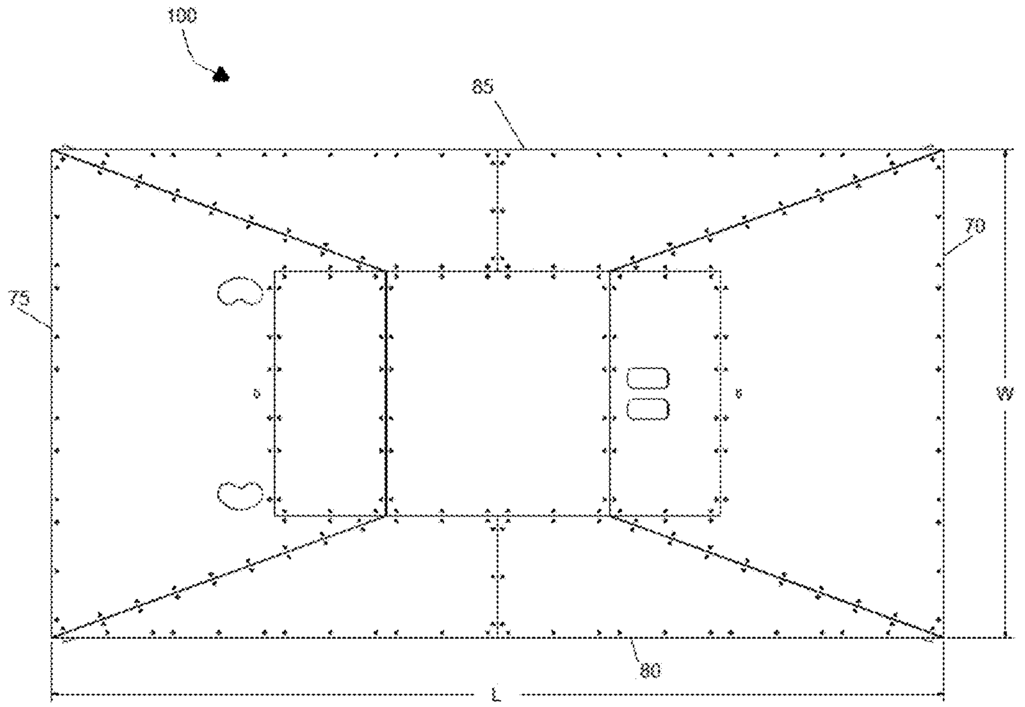
FIG. 3 is a top plan view of the example DME of FIG. 1 according to various example embodiments.
Figure 4:
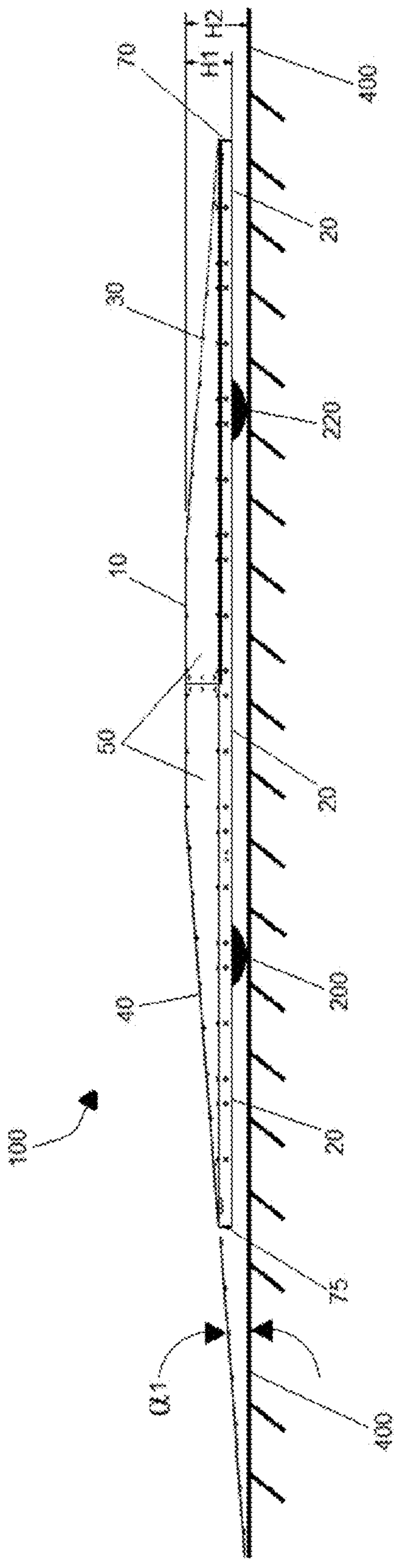
FIG. 4 is a left side elevation view of the example DME of FIG. 1 according to various example embodiments.
Figure 5:
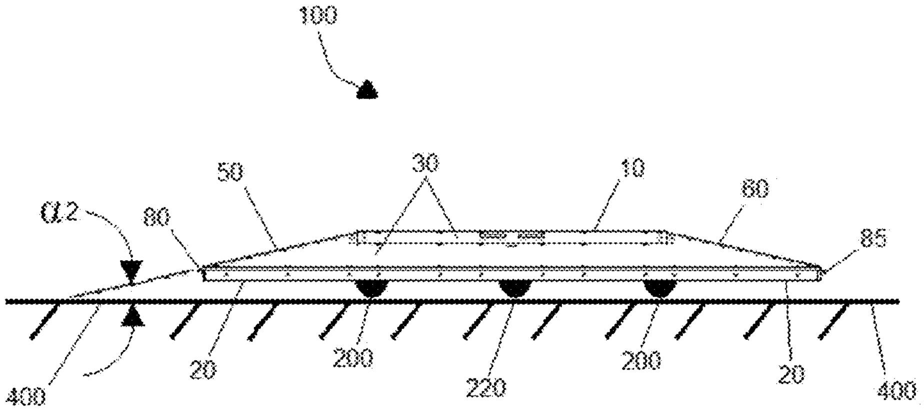
FIG. 5 is a rear side elevation view of the example DME of FIG. 1 according to various example embodiments.
Figure 6A:
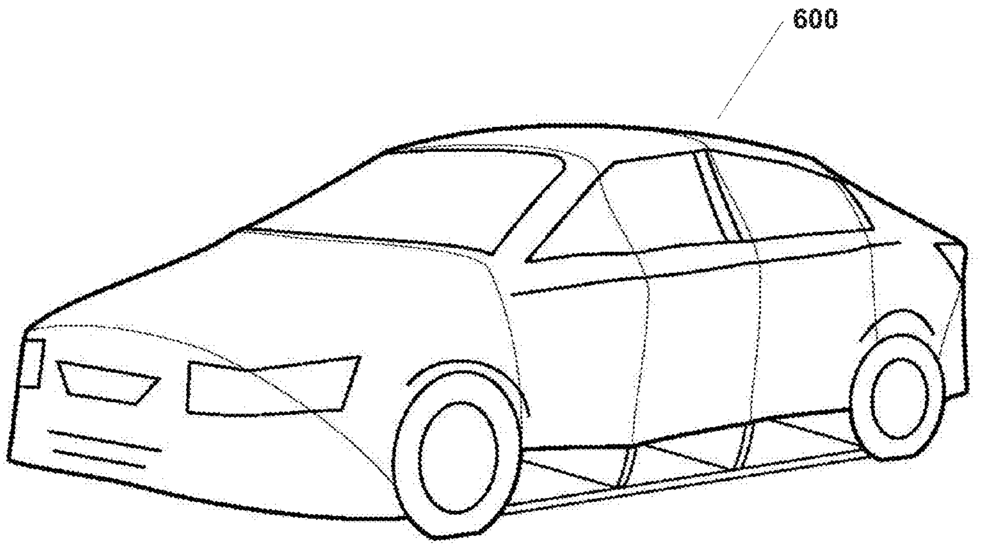
FIG. 6A is a front perspective view of an example light passenger vehicle GST according to various example embodiments.
Figure 6B:
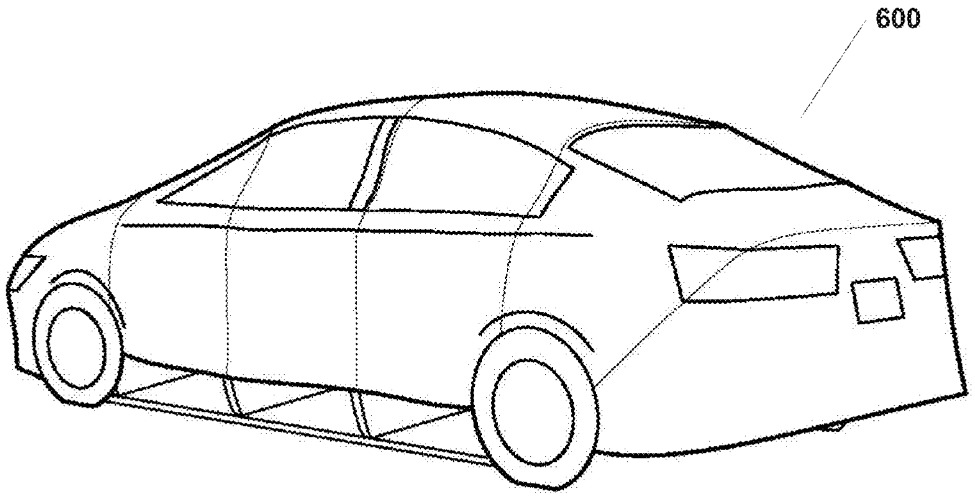
FIG. 6B is a back perspective view of the example light passenger vehicle GST of FIG. 6A according to various example embodiments.
Figure 6C:
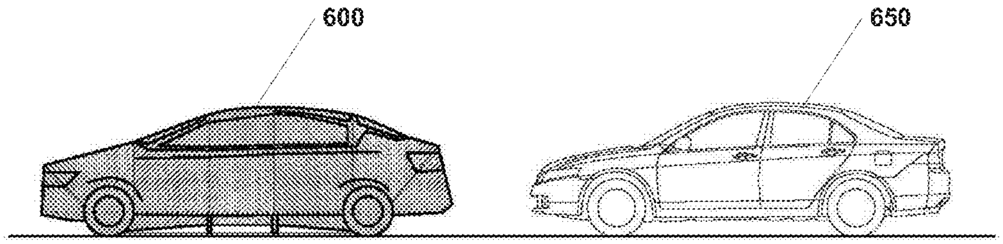
FIG. 6C is a side elevation view of the example light passenger vehicle GST of FIG. 6A, shown before being impacted by an example subject vehicle, according to various example embodiments.
Figure 6D:
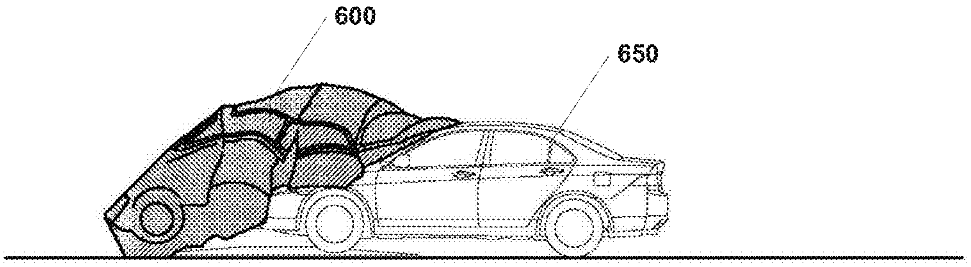
FIG. 6D is a side elevation view of the example light passenger vehicle GST of FIG. 6A, shown while being impacted by an example subject vehicle, according to various example embodiments.

As illustrated in the example embodiments shown in FIGS. 3, 4 and 5, the large horizontal dimensions L, W, and small height H1, H2, of DME 100 create shallow approach angles α1, α2, minimizing the load imparted horizontally when driven over by the subject vehicle 650, for instance as shown in FIG. 6D. These dimensions also minimize the potential for contact between the subject vehicle 650 structure (e.g., undercarriage or bumpers) and the DME 100 structure, for instance by the DME flipping up against the subject vehicle 650 when the GST is impacted by the subject vehicle 650.

With reference to FIG. 3, to avoid "flip up" of the DME 100 under the subject vehicle 650, dimension L may optimally be selected to be greater than or equal to the wheelbase of the typical subject vehicle 650 (i.e., the distance from the centerline of the front axle to the centerline of the rear axle of the subject vehicle 650). To minimize the effect of the DME 100 on the radar and other sensor signatures of the GST, dimension L may be selected to be less than the overall length of the soft body 600. In a first embodiment, dimension L may be selected to be about 2000 millimeters, plus or minus 300 millimeters, for instance for use with smaller vehicles. In a second embodiment, dimension L may be selected to be about 2600 millimeters, plus or minus 300 millimeters, for instance for use with larger vehicles. In a third embodiment, dimension L may be selected to be about 3200 millimeters, plus or minus 300 millimeters, for instance for use with long vehicles. In a fourth embodiment, dimension L may be selected to be about 4000 millimeters, plus or minus 500 millimeters, for instance for use with very long wheel-base vehicles such as crew cab long bed pick-up trucks.

Also to avoid "flip up" of the DME 100 under the subject vehicle 650, dimension W may optimally be selected to be greater than or equal to the track width of the typical subject vehicle 650 (i.e., the distance from the center of the driver's side tires to the center of the passenger's side tires of the subject vehicle 650). To minimize the effect of the DME 100 on the radar and other sensor signatures of the GST, dimension W may be selected to be less than the overall width of the soft body 600. In the first embodiment, dimension W may be selected to be about 1200 millimeters, plus or minus 300 millimeters, for instance for use with smaller vehicles. In the second embodiment, dimension W may be selected to be about 1800 millimeters, plus or minus 300 millimeters, for instance for use with larger vehicles. In the third and fourth embodiment, dimension W may be selected to be about 2600 millimeters, plus or minus 500 millimeters, for instance for use with very large vehicles such as heavy trucks.

Any other lengths for dimensions L and W may be used as long as they coordinate with each other and dimension H1 to result in angles α1, α2, falling within appropriate ranges, discussed below. For example, in the example embodiments shown in FIGS. 6A-6D where the subject vehicle 650 was a late model Honda Accord, dimension L was selected to be about 2790 millimeters, dimension W was selected to be about 1520 millimeters, and was selected to be about 100 millimeters (plus or minus 10 millimeters). Dimensions L and W can be smaller than the first embodiment where the GST is a smaller object such as a pedestrian 700, such as in the example DME 100' shown in FIG. 7. Finally, dimensions L and W could be scaled up beyond those provided in the fourth embodiment to work with even larger subject vehicles 650.

With reference to FIGS. 4 and 5, H1 is the vertical dimension from the bottom 20 to the top 10 of DME 100. H2 is the vertical dimension from the ground 400 (ground 400 meaning the surface of the road or other surface on which the DME 100 travels) to the top 10 of DME 100. To minimize disturbance to the ride of the subject vehicle 650, H2 is preferably as small as possible. Minimizing H2 tends to prevent discomfort to drivers and potential accidents, and minimizes chances of damage to the subject vehicle 650 or instrumentation attached thereto, airbag deployment, and the like. H2 is also preferably minimized to prevent the chance of the DME 100 striking the bottom of the subject vehicle 650 even when the DME 100 does not "flip up." Minimizing H2 requires minimizing both H1 and Ground Clearance (GC). The Ground Clearance or GC of the DME 100 is the vertical distance from the ground 400 to the bottom 20 of DME 100, and is calculated by subtracting H1 from H2. Nominal Ground Clearances that have been found to work acceptably include distances of about 12 to 19 millimeters, and at least about 5 millimeters but preferably no more than 50 millimeters. In the embodiments described herein H1 has been minimized to about 100 millimeters, plus or minus 10 millimeters. Using other materials and smaller components could potentially reduce H1 even further. Adding typical Ground Clearance of about 12 to 19 millimeters to H1 of about 90 to 110 millimeters yields an overall H2 of about 100 to 130 millimeters, give or take a couple millimeters.

H1 and H2 are minimized not only to minimize ride disturbance of the subject vehicle 650 and to prevent contact of the DME 100 to the undercarriage of the subject vehicle 650, but H1 and H2 are also selected to coordinate with dimensions L and W so that angles α1, α2, are minimized and fall within appropriate ranges. As shown in FIG. 4, angle α1 is the angle between the ground 400 and the upper back surface 30 of the DME 100, or between the ground 400 and the upper front surface 40 of the DME 100, or both. In typical embodiments angle $\alpha 1$ is the same for both the front and back upper surfaces, 30, 40, of DME 100, however, angle $\alpha 1$ can differ between the front and rear the upper surfaces, 30, 40, of the DME 100 if the upper surfaces of DME 100 are not symmetrical about a central latitudinally-extending vertical plane. As shown in FIG. 5, angle $\alpha 2$ is the angle between the ground 400 and the upper left side surface 50 of the DME 100, or between the ground 400 and the upper right side surface 60 of the DME 100, or both. In typical embodiments angle $\alpha 2$ is the same for both the left and right upper surfaces, 50, 60, of DME 100, however, angle $\alpha 2$ can differ between the left and right upper surfaces, 50, 60, of the DME 100 if the upper surfaces of DME 100 are not symmetrical about a central longitudinally-extending vertical plane. Importantly, while upper surfaces 30, 40, 50 and 60 are shown as substantially flat planes each comprising multiple panels, any or all of upper surfaces 30, 40, 50 and 60 may be curved and not flat, or partially curved and partially flat. Where any or all of upper surfaces 30, 40, 50 and 60 are curved and not flat, or are partially curved and partially flat, angles $\alpha 1$, $\alpha 2$, may be measured between the ground 400 and the steepest portion of any of corresponding upper surfaces 30, 40, 50 and 60. For purposes of this measurement the steepness or angle of a curve at a given point is measured by a line tangent to the curve at that point, i.e., the first derivative thereof, as is known in the art.

Like H2, angles $\alpha 1$, $\alpha 2$, are minimized to minimize ride disturbance of the subject vehicle 650 and to make the subject vehicle 650 travel as smoothly as possible over the DME 100. In various embodiments $\alpha 1$ and $\alpha 2$ may each be selected to be between about 4 degrees to about 45 degrees. In one example embodiment $\alpha 1$ is selected to be about 4 degrees while $\alpha 2$ is selected to be about 12 degrees.

ACATs often use various types of radar and other sensors to detect obstacles in the path of the subject vehicle 650, and to alert the driver or take evasive action or some other action if the ACAT determines that the subject vehicle is likely to collide with such an obstacle. Accordingly, radar and other sensor systems have often been designed not to be triggered by items normally in the roadway, such as raised manhole covers and highway construction plates, or at least distinguish between such items close to the roadway and larger items, such as another vehicle. Still, some ACAT systems may trigger an alarm or some other type of response if they detect something in the roadway as large as a DME 100. For this reason, it has been discovered to be important to minimize the observability of the DME 100 by radar and other sensors. Additionally, to achieve accurate results when testing ACATs against GSTs that simulate objects such as vehicles, pedestrians, or other objects, it is helpful to minimize the distortion of the radar or other sensor signatures of the simulated soft vehicle, pedestrian, or other object that is caused by the presence of the DME 100. For this separate reason it has been discovered to be important to minimize the observability of the DME 100 by radar and other sensors.

The geometries disclosed herein for DME 100 have been found to effectively minimize the observability of the DME 100 by radar and other sensors. While all of the geometries disclosed above are useful for minimizing the observability of the DME 100 by radar and other sensors, it has been discovered that the following characteristics are individually and together particularly helpful in minimizing the observability of the DME 100 by radar and other sensors: H2 less than about 350 millimeters, and preferably not more than about 300 millimeters; $\alpha 1$ and $\alpha 2$ not more than about 45 degrees, and L and W dimensions within the corresponding length and width dimensions of the Soft Collision Partner 600 (shown in FIGS. 6A-6D) or other item that is mounted to the DME 100 to create the GST. For example, for a typical Soft Collision Partner 600 the L and W dimensions may be not more than about 4880 millimeters for L and about 1830 millimeters for W. Other L and W dimensions may be appropriate for other GSTs, as will be apparent to persons of skill in the art upon reviewing this disclosure.

The DME 100 may also employ retractable running gear, such that the structure "squats" onto the road surface when driven over by the subject vehicle 650. This creates a direct load path from the tires of the subject vehicle 650 to the ground 400 without passing through the GST wheels 200, 220 and associated suspension components. This may be accomplished through the use of pneumatic actuators that create just enough force to deploy the wheels 200, 220 and lift the DME 100 to its maximum ground clearance (H2 minus H1), for instance approximately one centimeter. In these embodiments the DME structure 100 can squat passively under the loading of the tires of the subject vehicle 650, without requiring dynamic actuation.

6.4 Example Dynamic Motion Element Braking Systems and Methods

The DME structure 100 may be provided with front and/or rear brakes, such as disc brakes, to provide braking capability during a conflict scenario or to bring the DME 100 to a stop after a scenario. The brakes may be actuated autonomously by the DME 100 according to a pre-programmed trajectory or other conditions or by a test engineer via a radio transmitter in order to perform an emergency-stop, for example.

Figure 9:
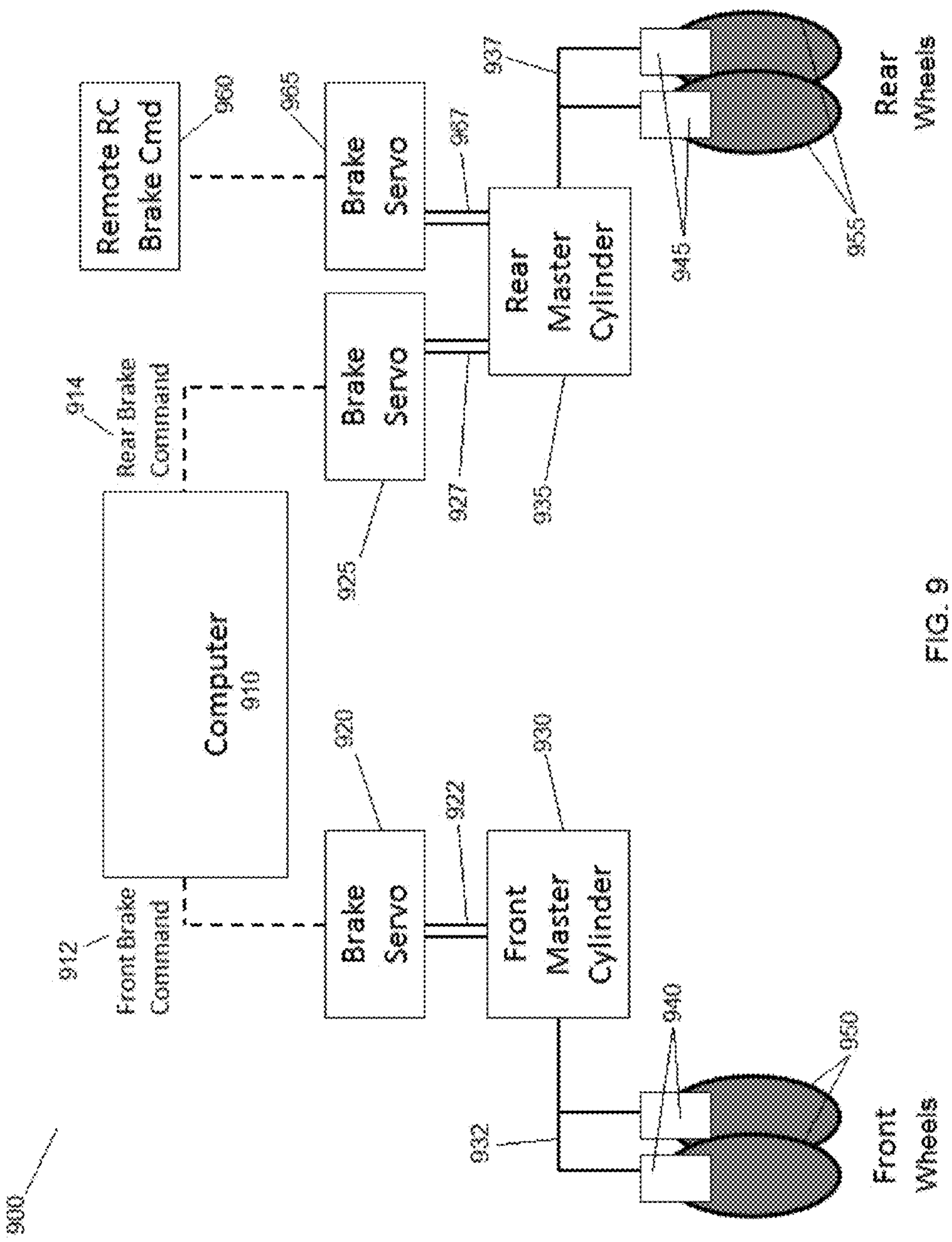
FIG. 9 is a diagram of an example computerized braking system for a DME showing certain example features.

FIG. 9 illustrates an example braking system 900 adapted for use with a DME 100. Example braking system 900 may be controlled by a computer 910, such as the GST Computer, which may in certain embodiments send independent braking command signals, such as a front brake command 912 and rear brake command 914. In other embodiments commands may be sent to each wheel brake individually, or to a subcombination of the wheel brakes, or a single command may be sent to all the wheel brakes at once. The front and rear brake commands 912, 914, may in certain embodiments activate front and rear brake servos, 920, 925, respectively, which may in turn be mechanically coupled by mechanical actuators 922, 927, to front and rear master cylinders 930, 935. Front and rear master cylinders 930, 935 may be hydraulically and/or pneumatically connected by lines 932, 937, to brake actuators 940, 945, such as disc brake calipers. The brake actuators 940, 945, then actuate brakes on the front and rear wheels 950, 955, such as disc brakes.

For increased safety a redundant, parallel braking system may be provided, such as remotely controlled brake command system 960 that upon activation sends an independent braking command to a brake servo, such as an independent brake servo 965. The independent brake servo 965 may be mechanically coupled by one or more mechanical actuators 967 to rear master cylinder 935, to brake the rear wheels 950. It will be understood that this is just one example architecture for a redundant, parallel braking system. For instance, in other embodiments the remotely controlled brake command system 960 may send braking commands to any or all of the brake servos.

In various example embodiments each wheel, 950, 955, of the DME 100 may be equipped with its own brake rotor and caliper 940, 945. The rear brake system may have a separate hydraulic master cylinder 935 from the front master cylinder 930 for the front brake system, or they may use the same master cylinder, which may have one or more hydraulic reservoirs dedicated to separate hydraulic lines 932, 937, as in a typical passenger vehicle. Each master cylinder 930, 935 may be independently actuated by its own electric servo motor 920, 925. The front and/or rear brakes may be controlled by a computer 910, or manually, remotely controlled by a remotely controlled brake command system 960. In certain embodiments the brake disc(s) for the non-driven wheel(s) are attached to the hubs of the non-driven wheel(s), while the brake disc(s) for the driven wheels may be attached to the driveline, such as a motor-driven pulley (not shown), and apply braking to the rear wheels via the driveline, such as via drive belts.

Typically all brakes are automatically applied by the computer 910 if communication to the operator's station 850 is lost. Automatic application of brakes upon loss of communication increases safety, as do redundant brake systems. The brake servos may also be adapted to be normally actuated, such that they automatically activate the brakes when electrical power is lost. Additionally, wheel rotation sensors, control feedback loops and processors may be included to provide additional features such as anti-lock brakes, stability control, and the like. Stability control, for instance, is a computerized technology that can improve the DME 100's stability by detecting and reducing excessive yaw motion by applying braking and/or traction forces. When stability control systems detect excessive yaw motion, they can automatically apply the brakes on various specific wheels to help reduce excessive yaw motion thereby helping to "steer" the vehicle along the intended path. Braking may be automatically applied to wheels individually, such as the outer front wheel to counter oversteer or the inner rear wheel to counter understeer. Stability control systems may also reduce drive forces until control is regained.

Combining some or all of these features provides increased sustained braking capability limited only by tire traction, allowing the DME 100 to replicate real-world vehicle motions and levels of deceleration. The DME 100 is designed to coordinate movement with the subject vehicle, which requires that it be able to accurately follow the speed profile (including decelerations and turns) of the collision partner. Computer-controlled adjustable brake bias between front and rear brakes, or between any or all brakes, allows full utilization of potential braking power and control. Computer-controlled adjustable brake bias also obviates the need for mechanical adjustments, such as whiffletree linkage to adjust brake bias. It also allows the brake bias to be adjusted automatically in real-time based on the state of the DME 100, for instance due to changing maneuvers, different weight and size Soft CP 600 bodies, changing road surface conditions, changing winds, and the like.

6.5 Example Break-Away Antenna Systems

Figure 10A:
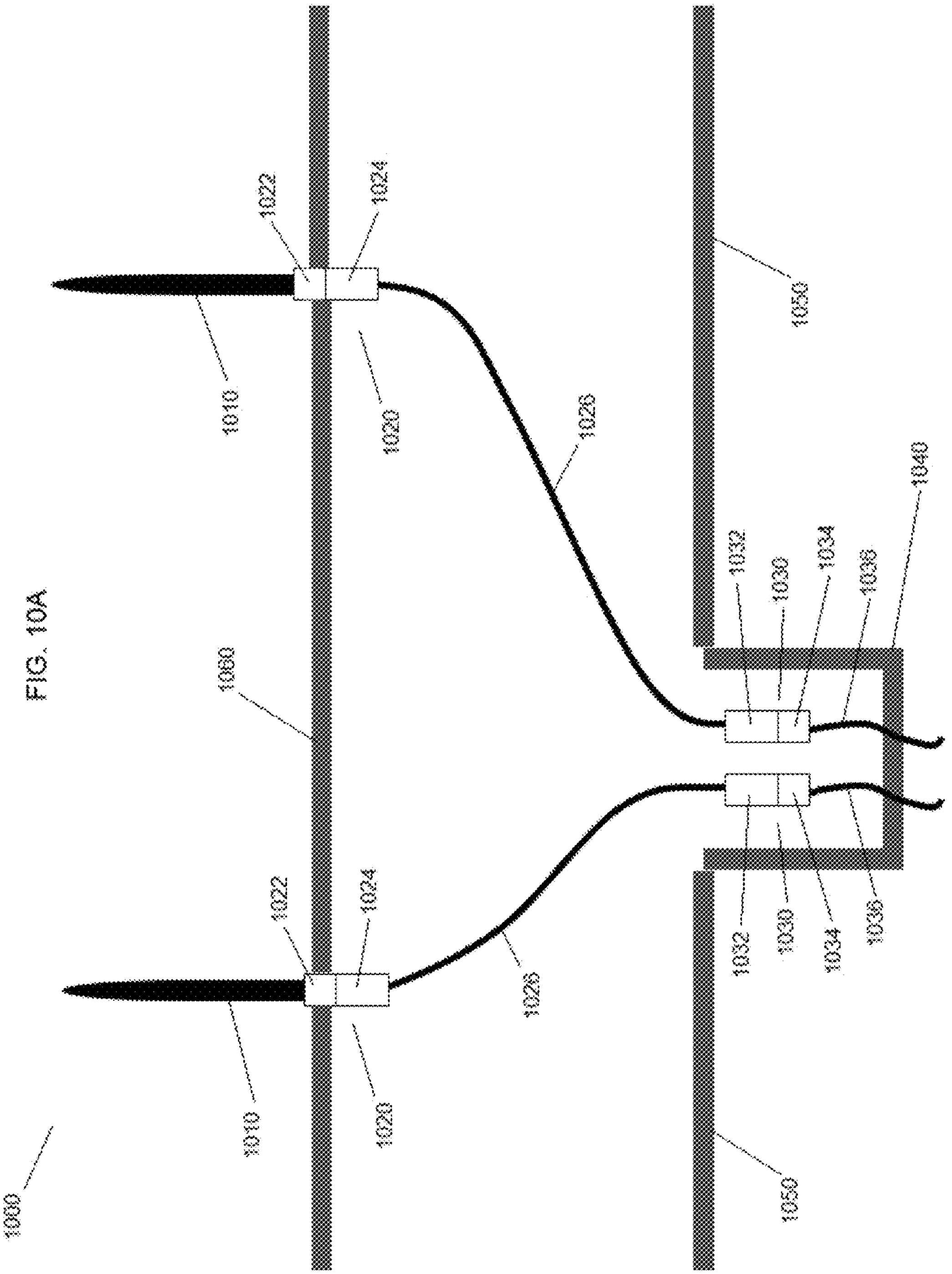
FIG. 10A is a sectional side elevation view of a break-away antenna system according to various example embodiments, shown in the normally installed position.
Figure 10B:
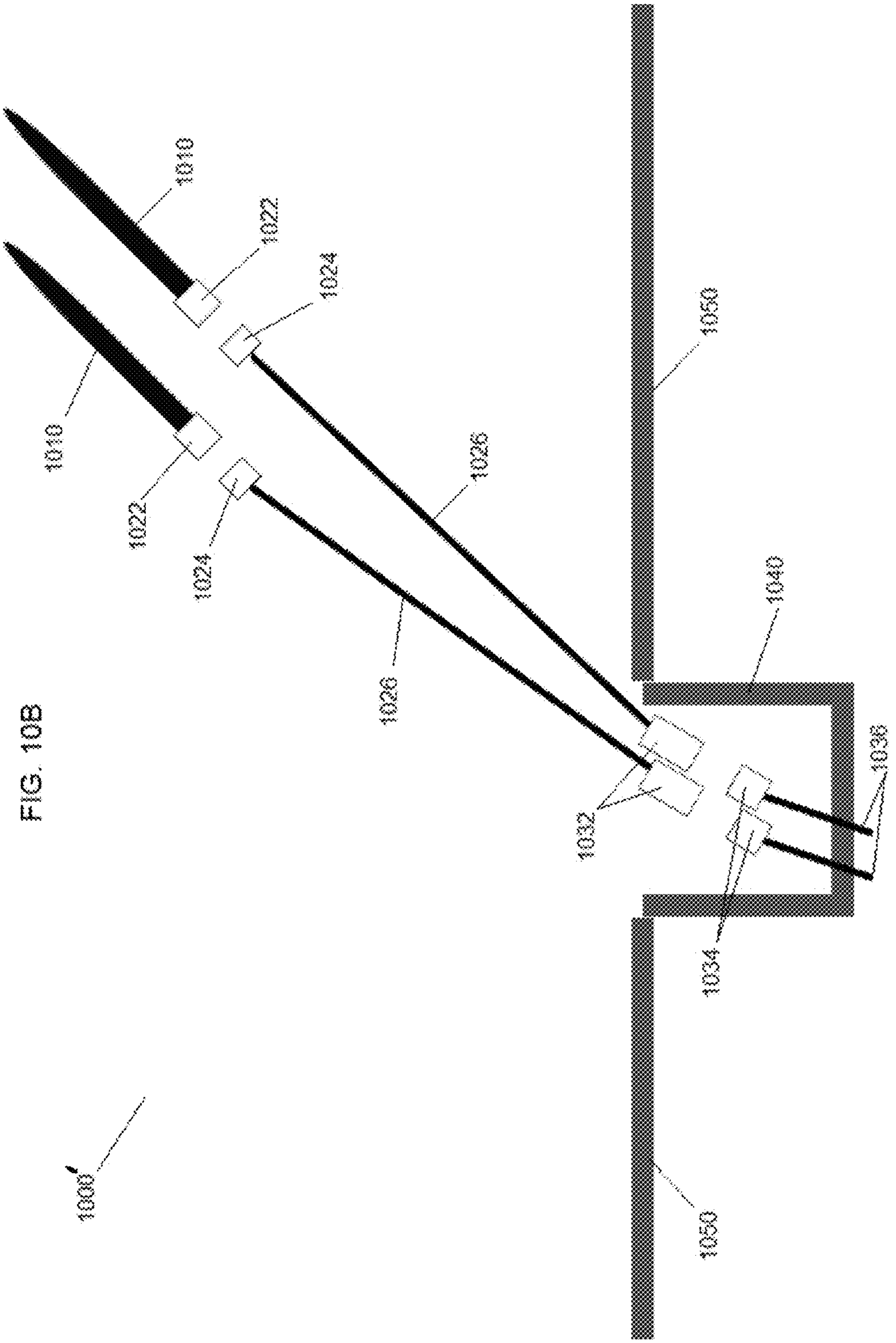
FIG. 10B is a section side elevation view of the break-away antenna system of FIG. 10A, shown during break-away, for instance during impact.

The DME 100 may include various antennas so that the subject vehicle 650, base station 850, and/or others may communicate with the DME 100. However, the presence of a soft car body 600 on top of the DME 100 may tend to cover-up one or more of the antennas on the DME 100, limiting the range of the antennas or rendering them inoperable. Additionally, antennas attached to and protruding from the DME 100 may be broken when the DME 100 is impacted and run over by a subject vehicle 650. Provided in FIGS. 10A and 10B is an example break-away antenna system 1000 that addresses all of these issues. In various example embodiments antenna system 1000 may include one or more antennas 1010 attached with and/or protruding from the exterior 1060 of the body of the soft car 600 so that the base station 850 and/or others may communicate with the DME 100 through the antennas 1010. The one or more antennas 1010 may include an outer break-away connection 1020 proximate the body 1060 and comprising two removably-connectable connectors 1022, 1024 connecting the antenna 1010 to an outer antenna wire 1026. The outer antenna wire 1026 may be connected with an inner break-away connection 1030 proximate the exterior surface 1050 of the DME 100 and comprising two removably-connectable connectors 1032, 1034 connecting the outer antenna wire 1026 to an inner antenna wire 1036. To protect the connector 1034 and wire 1036 in the event the DME 100 is run over by a subject vehicle 650, the connector 1034 and wire 1036 may be recessed in a cup-like or similar structure 1040 below the outer surface 1050 of the exterior of the DME 100. The connector 1034 and wire 1036 may also be left with some slack inside the cup 1040 to facilitate safe disconnection of the connectors 1032, 1034 during impact, as depicted in FIG. 10B.

FIG. 10B depicts the example antenna system 1000 after impact 1000', when the soft car body 600 has been ripped away from the DME 100 due to being impacted by a subject vehicle 650. In this example, the outer antenna wires 1026 and inner antenna wires 1036 were pulled taut when the exterior 1060 of the body of the soft car 600 was ripped away from the DME 100 by impact with a subject vehicle 650. The resulting tensile force in the wires 1026, 1036 was sufficient to disengage connectable connectors 1022, 1024, 1032, and 1034 (though in certain instances only connectable connectors 1022, 1024 or connectable connectors 1032, 1034 might be disengaged). The slack in the wires 1026, 1036 allowed the removably-connectable connectors 1032, 1034 to substantially align with wire 1026 prior to applying tensile force to removably-connectable connectors 1032, 1034, which increases the chances of successful disconnection and decreases the chances of damage to the connectors 1032, 1034. The connector 1034 and inner wire 1036 remained inside the cup 1040 beneath the exterior surface 1050 of the DME 100, and were thus safe from being damaged by the subject vehicle 650. The antennas 1010 and other components are typically removed with the body of the soft car 600 and can be reused by re-connecting connectors 1022, 1024 and 1032, 1034.

Any removably-connectable electrical RF connectors may be used for connectors 1022, 1024 and 1032, 1034, preferably ones adapted to be reusable. One suitable connector may be created by removing the locking bayonets from a standard BNC-type connector. In certain example embodiments connectors 1024, 1034 can be formed from either a male BNC or male TNC connector with the locking structures removed. Connectors 1022, 1032 then slide into connectors 1024, 1034 and remain engaged during normal use but can be easily pulled out during an impact. The connectors 1020, 1030 will withstand and remain connected for tensile forces of at least 0.1 pounds, and will disconnect when subjected to tensile forces greater than 0.5 pounds. Standard connectors may be further modified to remove exterior edges that may catch on adjacent surfaces during impact. This can be accomplished with either a tapered collar composed of a low-friction material or by re-shaping the connector housing, for instance. In each case the communication between the DME 100 and the subject vehicle 650, and/or base station 850, is reliable but the antennas 1010 are also able to disconnect upon impact with the subject vehicle 650. The use of the removably-connectable connectors thus improves reliability and reusability.

6.6 Example Retractable Antenna Systems

Certain antenna types may be better protected upon impact by a subject vehicle 650 by being refracted into the body of the DME 100, instead of being disconnected as described above with respect to FIGS. 10A and 10B. GPS antennas, for instance, are usually relatively wide and heavy, and would be problematic to disconnect from the DME 100 upon impact. Accordingly, provided are various example retractable antenna systems 1100, 1200, as shown in FIGS. 11A through 12C.

Figure 11A:
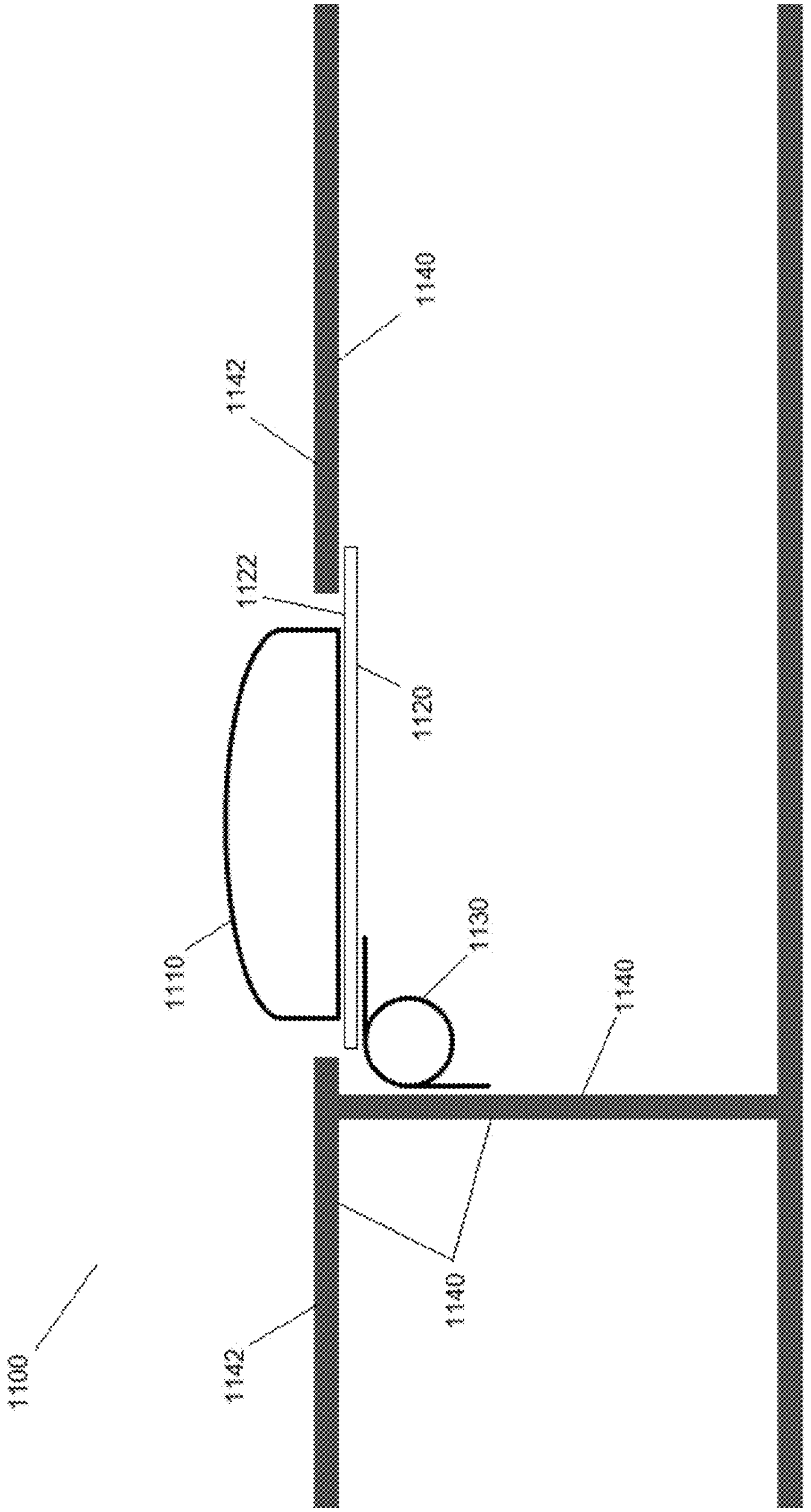
FIG. 11A is a sectional side elevation view of a first retractable antenna system according to various example embodiments, shown in the normally protruding position.
Figure 11B:
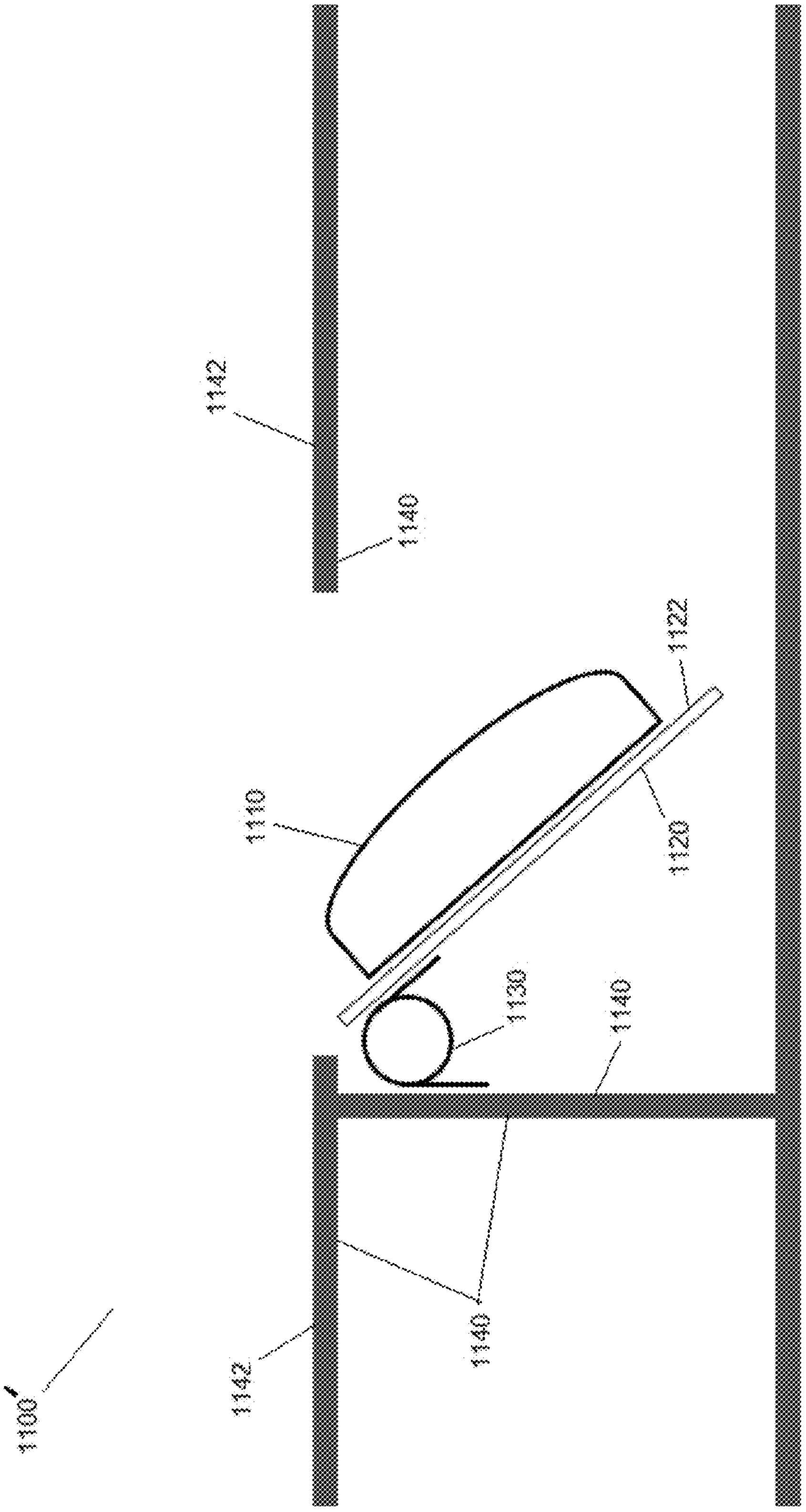
FIG. 11B is a section side elevation view of the first retractable antenna system of FIG. 11A, shown in the retracted position, for instance during impact.

With reference to FIGS. 11A and 11B, provided is an example retractable antenna system 1100, comprising an antenna 1110 such as a GPS antenna retractably mounted to the DME structure 1140. In certain embodiments GPS data is the primary signal used for guidance, navigation, and control of the DME 100 and coordinating its movement with the subject vehicle 650. For example, a GPS antenna 1110 may be mounted to a retractable member 1120, for instance to a top surface 1122 of a retractable member 1120, such that at least a portion of the GPS antenna 1110 protrudes beyond the adjacent outer surface 1142 of the DME structure 1140 to facilitate communication with the antenna 1110. The top surface 1122 of the retractable member 1120 may be retractably biased against the DME structure 1140 by one or more springs 1130 connected with the DME structure 1140, such that when a downward force is applied to the GPS antenna 1110, as when a subject vehicle 650 runs over the DME 100, the spring 1130 is compressed and GPS antenna 1110 and retractable member 1120 retract at least partially beneath the outer surface 1142 of the DME structure 1140, for instance as shown in FIG. 11B. In the example shown in FIGS. 11A and 11B, a torsional spring 1130 is provided on one side of the GPS antenna 1110 and retractable member 1120, such that the GPS antenna 1110 and retractable member 1120 pivot about the spring 1130 relative to the DME structure 1140. When the downward force is removed from the GPS antenna 1110, the spring 1130 biased against the retractable member 1120 urges the retractable member 1120 and antenna 1110 to return toward their original position shown in FIG. 11A until the upper surface 1122 of the retractable member 1120 re-engages the DME structure 1140, so that at least a portion of the antenna 1110 protrudes beyond the adjacent outer surface 1142 of the DME structure 1140 to facilitate communication with the antenna 1110.

Figure 12A:
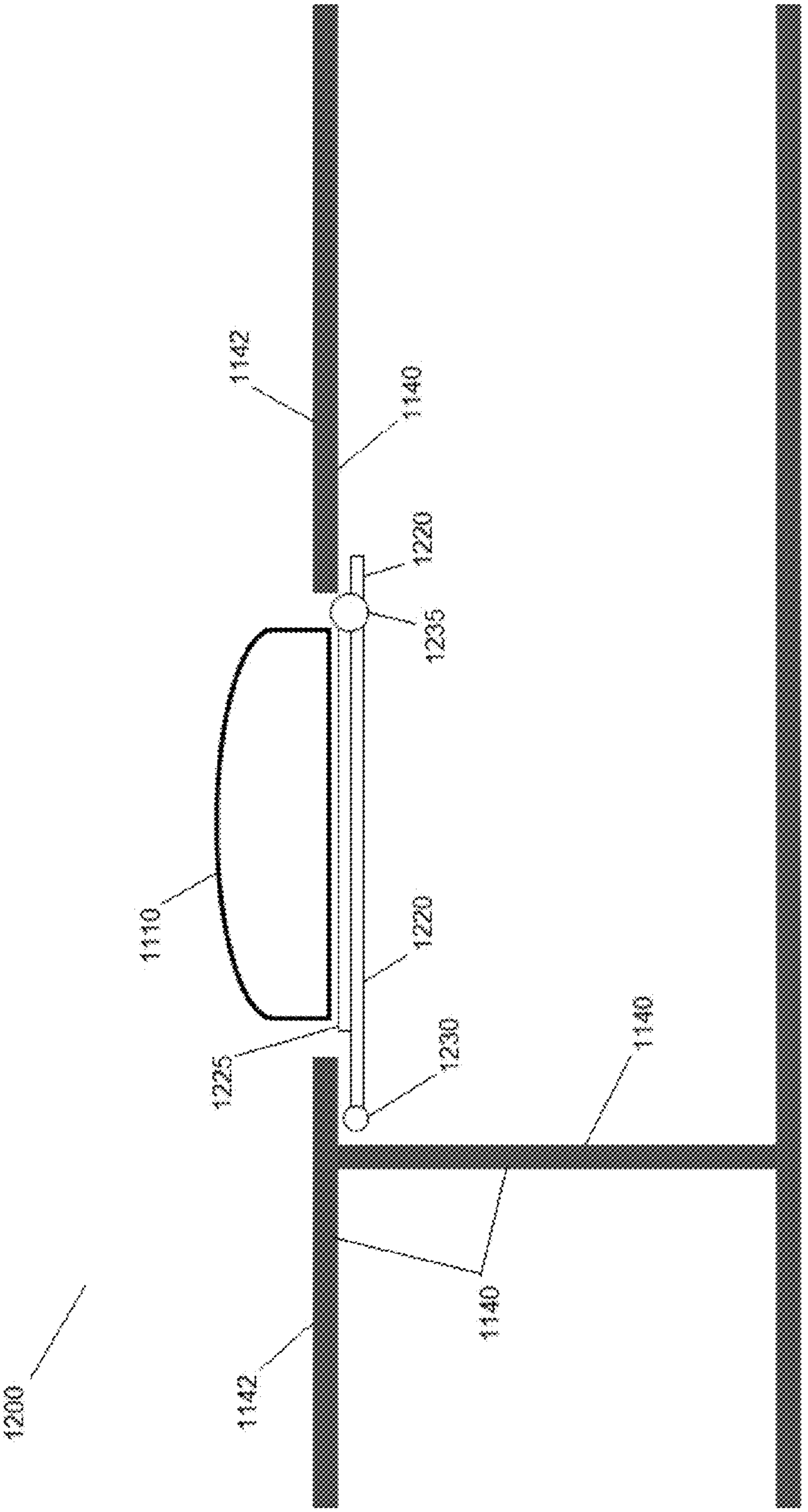
FIG. 12A is a sectional side elevation view of a second retractable antenna system according to various example embodiments, shown in the normally protruding position.
Figure 12B:
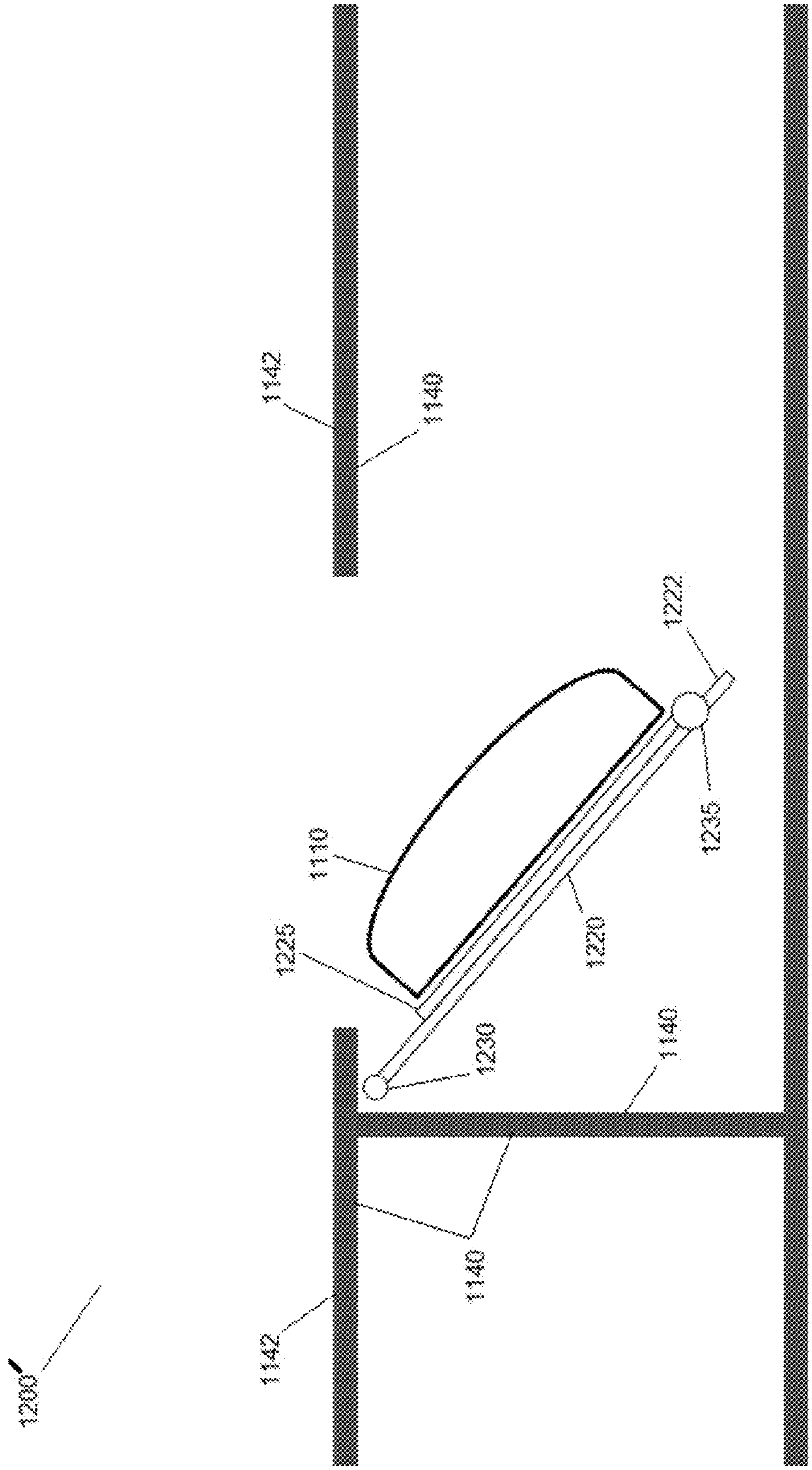
FIG. 12B is a section side elevation view of the second retractable antenna system of FIG. 12A, shown in a first retracted position, for instance during impact from a first direction.
Figure 12C:
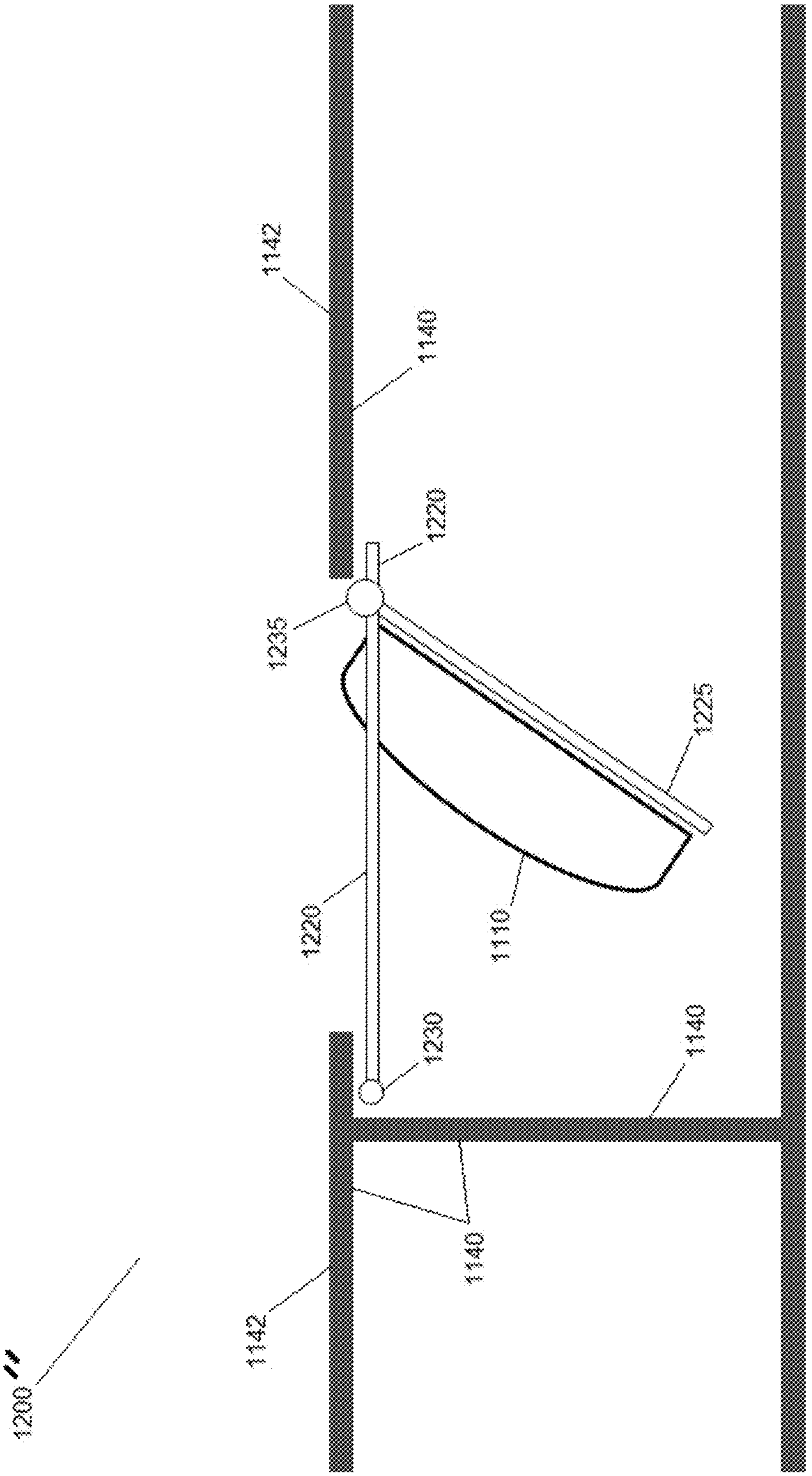
FIG. 12C is a section side elevation view of the second retractable antenna system of FIG. 12A, shown in a second retracted position, for instance during impact from a second direction.
Figure 13:
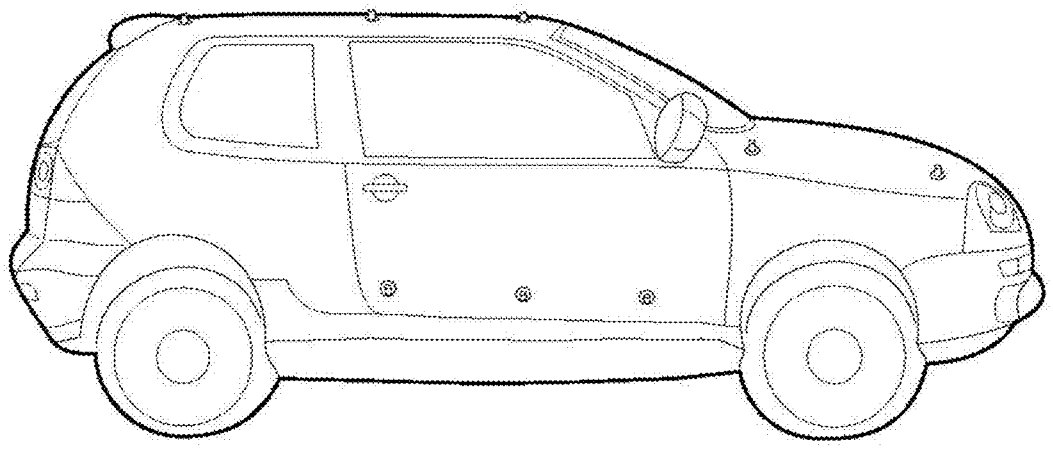
FIG. 13 is a side elevation view of an example prior art “balloon car” Soft Collision Partner.
Figure 14:
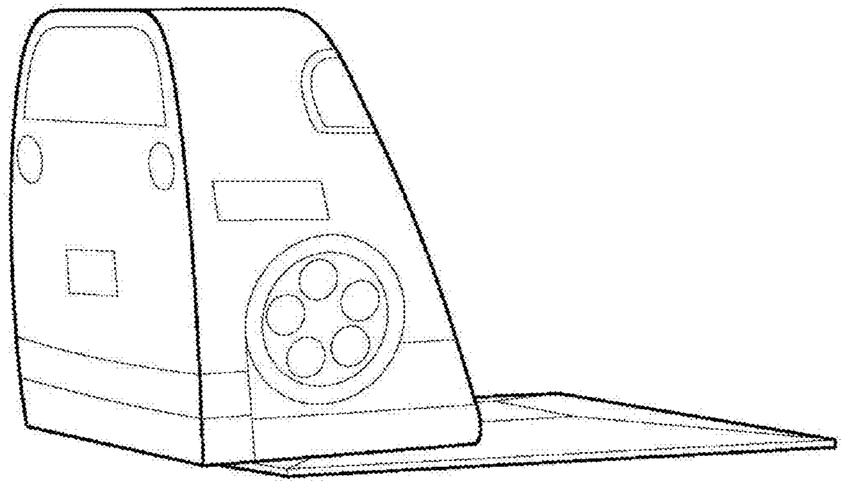
FIG. 14 is a back perspective view of an example prior art “NHTSA car-rear” Soft Collision Partner.
Figure 15:
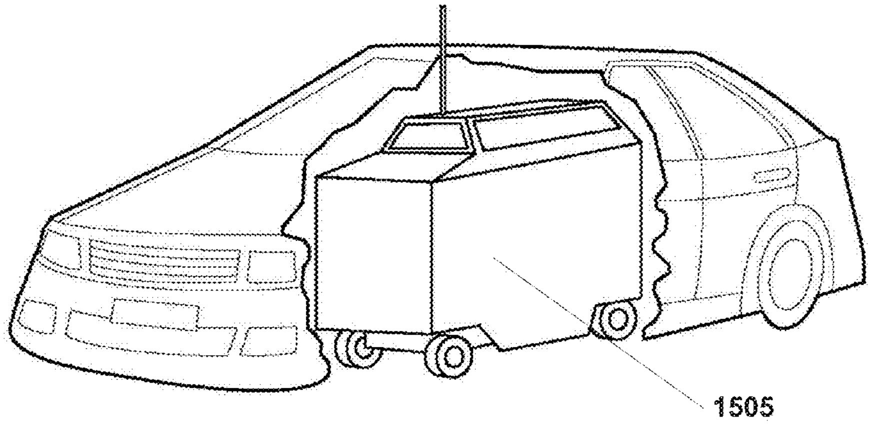
FIG. 15 is a front perspective view of an example prior art “ABD car” Soft Collision Partner.
Figure 17:
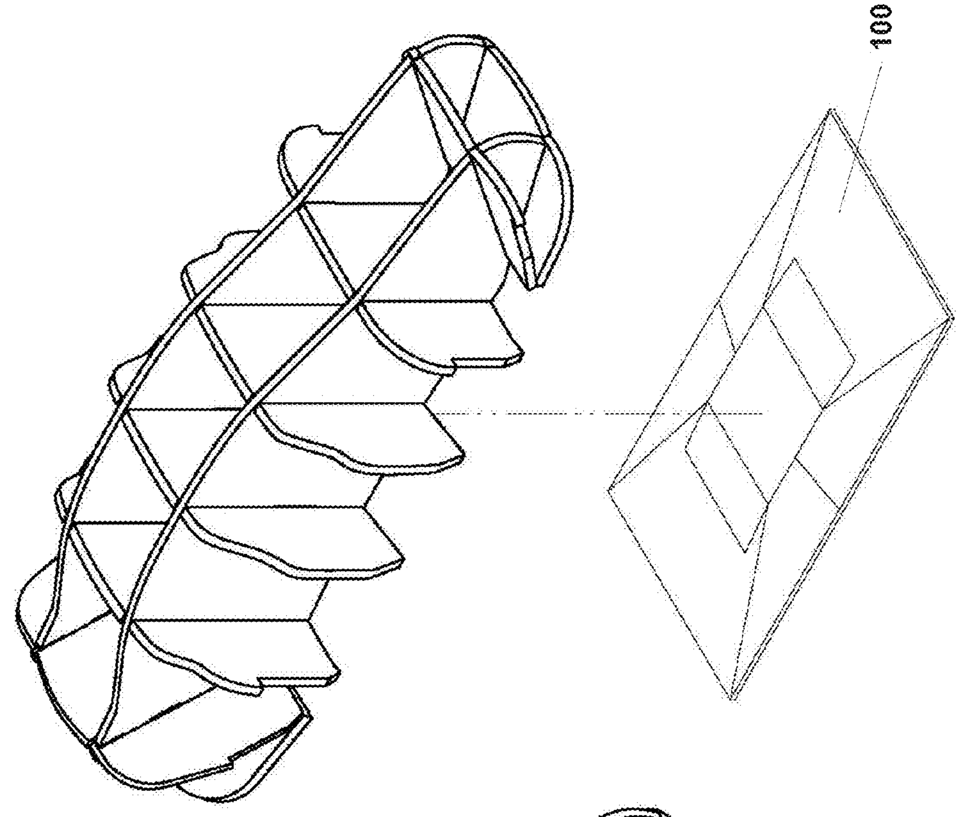
FIG. 17 is a side perspective view of an example Soft CP soft body and system according to certain example embodiments, with the outermost fabric skin removed, illustrating the mounting to a DME.
Figure 16:
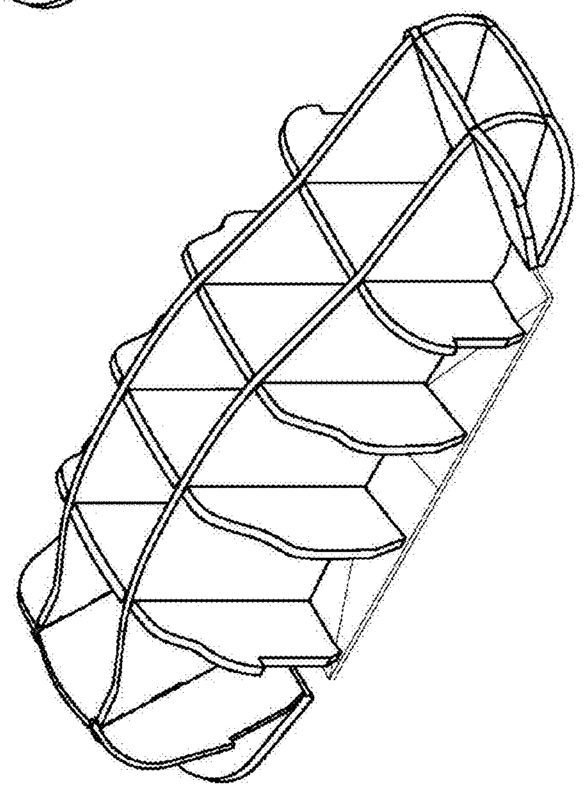
FIG. 16 is a side perspective view of an example Soft CP soft body and system according to certain example embodiments, with the outermost fabric skin removed, mounted on a DME.

Another example retractable antenna system 1200 is shown in FIGS. 12A through 12C. Like retractable antenna system 1100, retractable antenna system 1200 comprises an antenna 1110 such as a GPS antenna retractably mounted to the DME structure 1140. Unlike retractable antenna system 1100, retractable antenna system 1200 further comprises a GPS antenna 1110 mounted to a multiple-pivot-point assembly of retractable members 1220, 1225. For instance, retractable member 1220 may be retractably biased against the DME structure 1140 by one or more springs 1230 connected with the DME structure 1140, such that when a downward force is applied to the GPS antenna 1110, as when a subject vehicle 650 runs over the DME 100, the spring 1230 is compressed and GPS antenna 1110 and retractable member 1220 retract at least partially beneath the outer surface 1142 of the DME structure 1140, for instance as shown in FIG. 12B. Additionally, retractable member 1225 may be retractably biased against the retractable member 1220 by one or more springs 1235 connected with the retractable member 1220, such that when a downward force is applied to the GPS antenna 1110, as when a subject vehicle 650 runs over the DME 100, the spring 1235 is compressed and GPS antenna 1110 and retractable member 1225 retract at least partially beneath the outer surface 1142 of the DME structure 1140, for instance as shown in FIG. 12C. In the example shown in FIGS. 12A through 12C, torsional spring 1230, 1235 are provided on each side of the GPS antenna 1110 and retractable members 1220, 1225, such that the GPS antenna 1110 and retractable member 1225 pivot about the spring 1230 relative to the DME structure 1140, and the GPS antenna 1110 and retractable member 1225 pivot about the spring 1235 relative to the DME structure 1140. When the downward force is removed from the GPS antenna 1110, the springs 1230, 1235 biased against the retractable members 1220, 1225 urge the retractable members 1220, 1225 and antenna 1110 to return toward their original position shown in FIG. 12A until the upper surface of the retractable member 1220 re-engages the DME structure 1140 and the upper surface of the retractable member 1225 re-engages the retractable member 1220, so that at least a portion of the antenna 1110 protrudes beyond the adjacent outer surface 1142 of the DME structure 1140 to facilitate communication with the antenna 1110. This type of design provides bi-directional retraction that tends to minimize damage to the antenna 1110 while being forced into the DME 100 in either forward or rearward impacts.

In other embodiments, any other type of spring or similar acting mechanism may be provided that retractably urges the antenna 1110 beyond the adjacent outer surface 1142 of the DME structure 1140 to facilitate communication with the antenna 1110, while deflecting downward upon impact to reduce any possible large loads that would otherwise be transmitted through the antenna 1110 or antenna mount as would occur with a hard-mounted antenna that protrudes above the upper surface 1142 of the DME 100.

By limiting the forces on the antenna 1110, the present designs protect the antenna 1110 from damage while eliminating the need for a break-away connector for GPS or other antenna types. In the case of GPS, this improves signal reliability and provides a robust and consistent signal.

6.7 Example Soft Collision Partners, Systems and Methods

Figure 7:
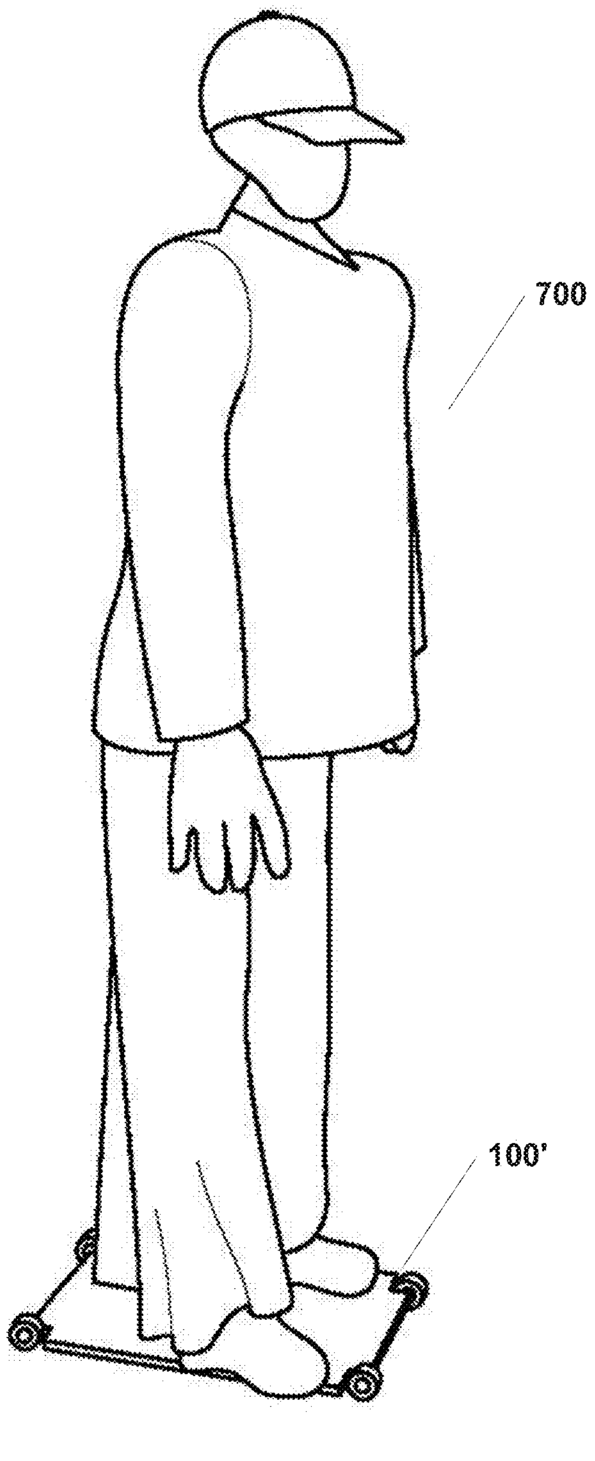
FIG. 7 is a front perspective view of an example pedestrian GST according to various example embodiments.

The soft car body or Soft CP 600 as shown in FIGS. 6A through 6D is removably mounted atop the DME 100 and is designed to minimize the potential for damage to the body panels of the subject vehicle 650 that impacts the soft car body 600. The soft car body 600 can be designed to replicate the three-dimensional shape and size of various objects, such as light passenger vehicles. It may be constructed completely from "soft" materials, such as polyethylene foam, hook-and-loop closure and flexible epoxy, for instance. The panels are typically soft and flexible, formed from one or more uniformly-distributed materials having an overall hardness no greater than 100 Shore OO. For example, the panels of the soft car body 600 and internal structure may be fabricated completely from light-weight, flexible and durable polyethylene foam, and may be connected to each other and to the DME 100 top surface by way of hook-and-loop or any similarly-functioning reclosable fastener material, such as 3M Dual Lock (3M trademark) reclosable fastener material. This minimizes the risk of tearing individual panels, and also allows for quick reassembly after a collision with the subject vehicle 650. The internal structure of the Soft CP 600 may be made up of bulkheads that interconnect to form a framework for the outer skin panels. These bulkheads can provide enough structural support for the body panels under higher speed aerodynamic loading but are light and flexible relative to the subject vehicle 650, thereby minimizing the load imparted to the subject vehicle 650 body panels in the event of a collision. Instead of a Soft CP 600 as shown in FIGS. 6A through 6D, any other shape may be attached to the DME 100 to form a GST, such as a pedestrian shape 700, as shown in FIG. 7.

Example methods of using the example embodiment of FIGS. 21 through 31 are shown in FIGS. 16 through 35. The presently disclosed Soft CP's may be removably mounted atop a DME 100 and are designed to minimize the potential for damage to the body panels of the subject vehicle 650 that impacts the Soft CP, such as the soft car bodies shown in FIGS. 16 through 35. The soft car body can be designed to replicate the three-dimensional shape and size of various objects, such as light passenger vehicles. It may be constructed completely from "soft" materials, such as polyethylene foam, hook-and-loop or similar closure and flexible epoxy, for instance. The panels of the soft car body and internal structure may be fabricated completely from lightweight, flexible and durable polyethylene foam, and may be connected to each other and to the top surface of the DME 100 by way of hook-and-loop or similarly functioning material. This minimizes the risk of tearing individual panels, and also allows for quick reassembly after a collision with a subject vehicle (also known as a test vehicle), for instance as shown in FIGS. 33 and 35. The internal structure of the Soft CP may be made up of bulkheads that interconnect to form a framework for outer skin panels or outer skin fabric. These bulkheads are adapted to provide enough structural support for the body panels under higher speed aerodynamic loading but are preferably light and flexible relative to the subject vehicle, thereby minimizing the load imparted to the subject vehicle body panels in the event of a collision.

Figure 30:
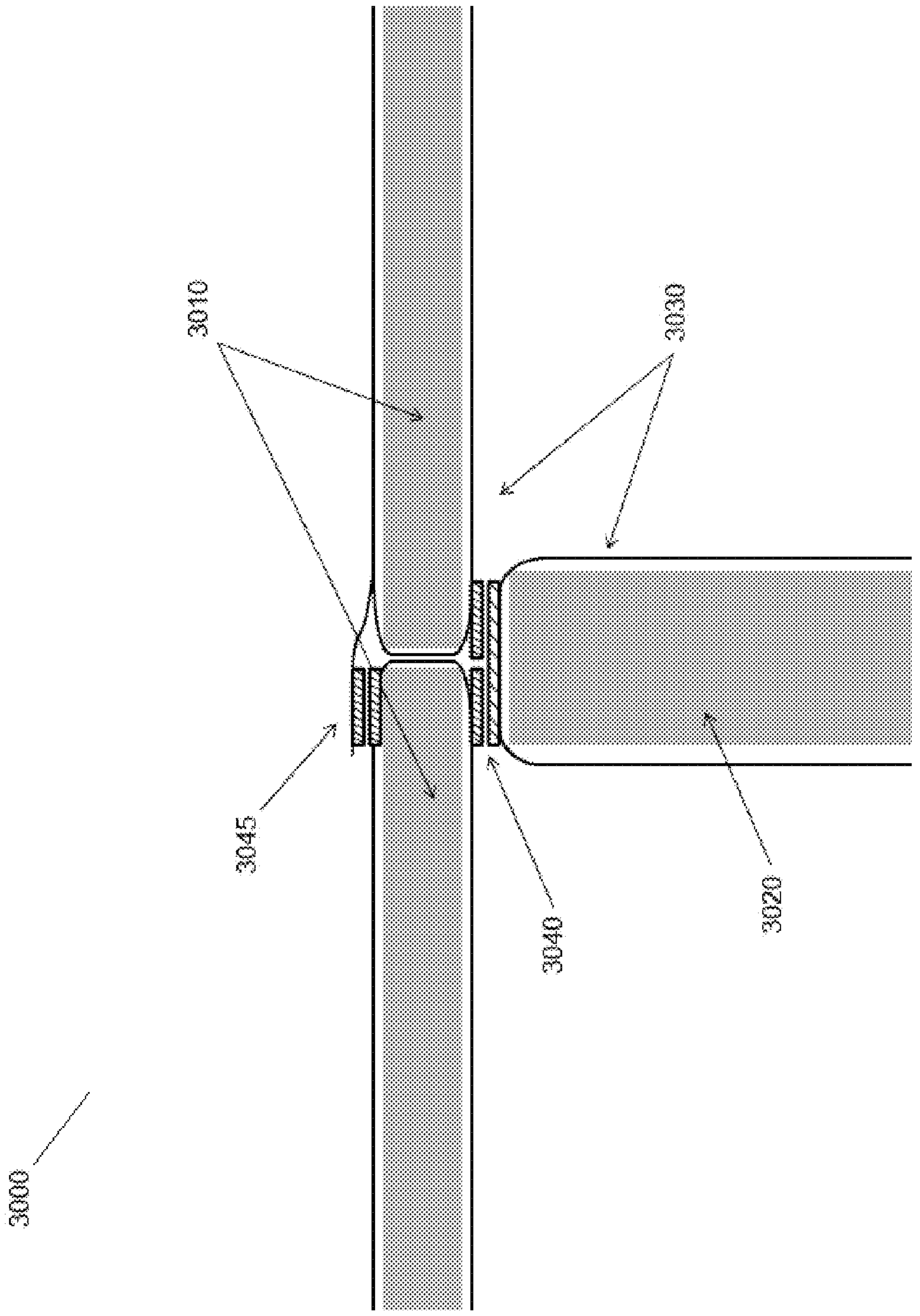
FIG. 30 is an end view of the intersection of example removably connectable panels of an example Soft CP soft body and system according to certain example embodiments.
Figure 31:
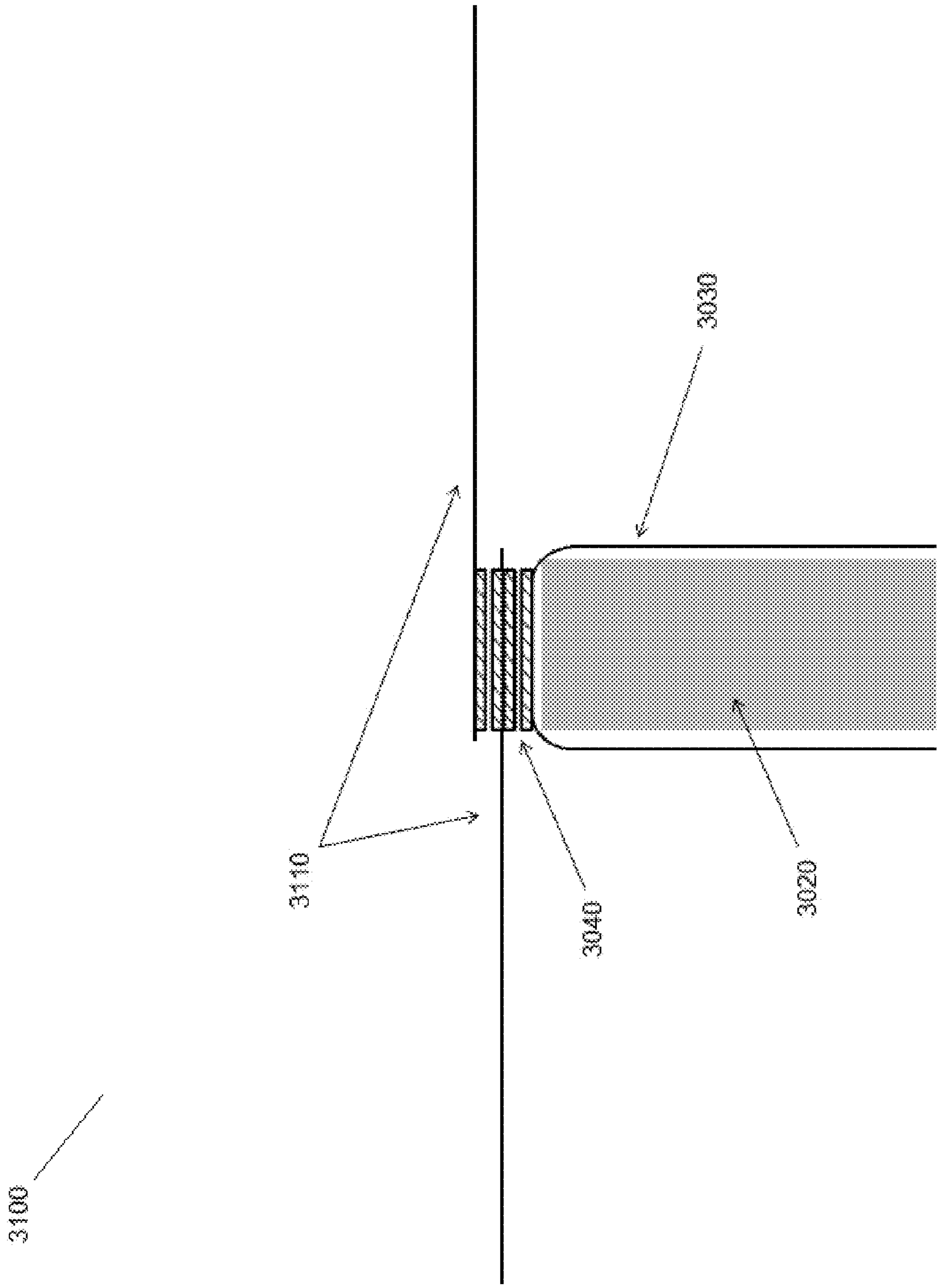
FIG. 31 is an end view of the intersection of example removably connectable fabric skin and panel of an example Soft CP soft body and system according to certain example embodiments.

Examples of removably connectable structures 3000, 3100 are shown in FIGS. 30 and 31. With respect to FIG. 30, a Soft CP may comprise one or more panels 3010, 3020, which may themselves be covered in fabric 3030, where the panels 3010, 3020 are constructed of polyethylene foam or any other suitably strong and rigid yet soft and readily yielding material, which may be at least partially surrounded or encased in one or more fabric covers 3030. Fabric covers 3030 may be constructed from any suitable material, such as canvas, and may provide abrasion resistance and surface strength to resist the impact of a subject vehicle 650, and may also provide connection surfaces for hook-and-loop or similar removable fastening material 3040 and may provide surfaces for photographic image printing and/or attachment of radar or other sensor reflective materials. Fabric covers 3030 may include one or more portions 3045 extending away from the body of the panel 3010, which portions or "tabs" 3045 are adapted to overlap with and removably connect to adjacent panels 3010, for instance with hook-and-loop material, or any other suitable reclosable fastener material, as shown in FIG. 30. In the example embodiment shown in FIG. 30, the panels include one or more internal bulkheads 3020, attached to and substantially covered by one or more fabric-wrapped foam skins 3010. In the example embodiment shown in FIG. 31, the fabric-wrapped foam skin coverings 3010 are replaced by fabric material or "skins" 3110.

Figure 29:
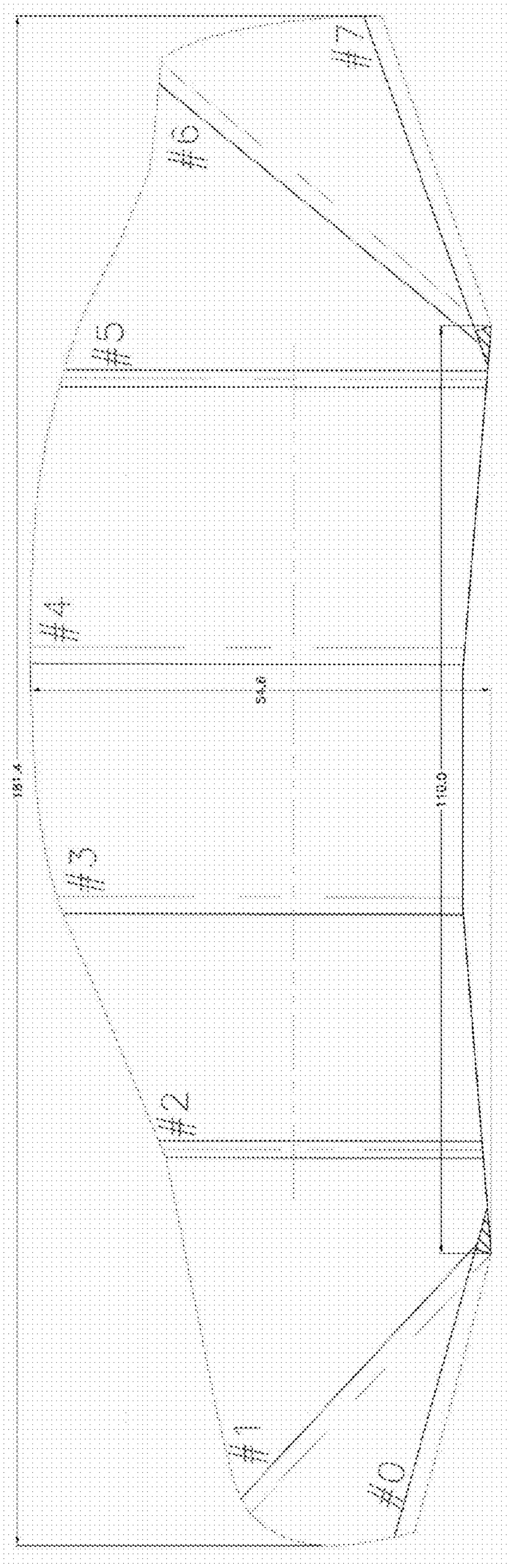
FIG. 29 is a side elevation view of the example Soft CP soft body and system of FIG. 22A, showing possible locations for the example panels shown in FIGS. 16 through 22, further including dimensions for certain example embodiments.

FIGS. 23 through 28 depict example numbered panels that may be assembled as shown in FIG. 29 to produce the example embodiment Soft CP shown in FIGS. 16 through 22B. Each of the example panels shown in FIGS. 23 through 28 may covered by the outside panels or fabric skins using connection systems as described above with respect to FIGS. 30 and 31.

Figure 18:
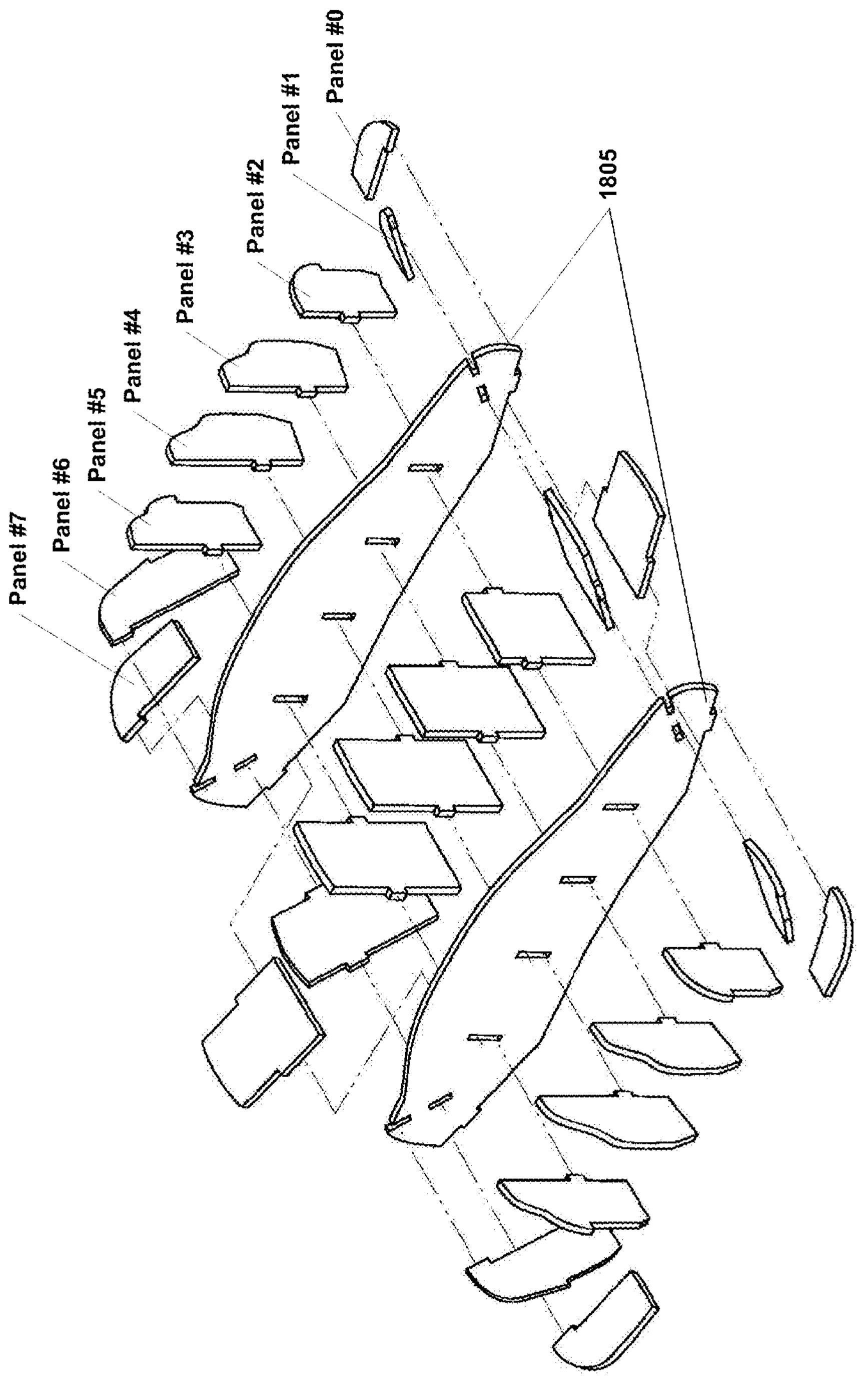
FIG. 18 is an exploded view of an example Soft CP soft body and system according to certain example embodiments, with the outermost fabric skin removed.
Figure 20:
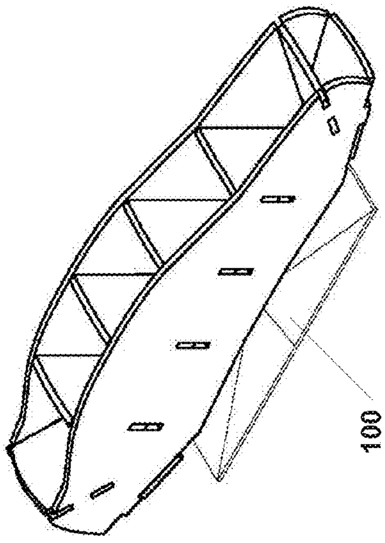
FIG. 20 is a side perspective of the example Soft CP soft body and system partially assembled (although more fully assembled than FIG. 19), according to certain example embodiments with the outermost fabric skin removed, mounted to a DME.
Figure 21:
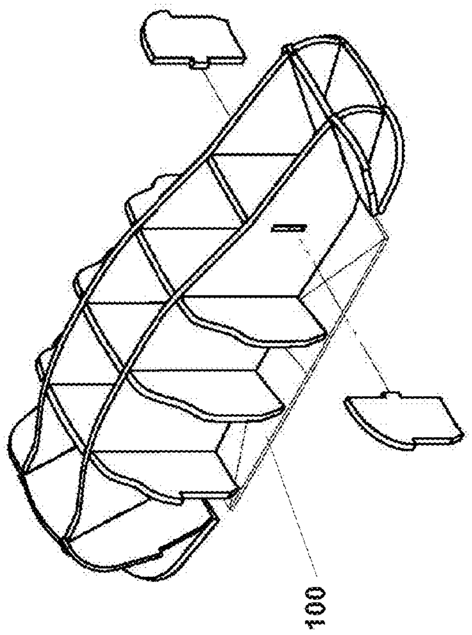
FIG. 21 is a side perspective of the example Soft CP soft body and system partially assembled (although more fully assembled than FIG. 20), according to certain example embodiments with the outermost fabric skin removed, mounted to a DME.
Figure 19:
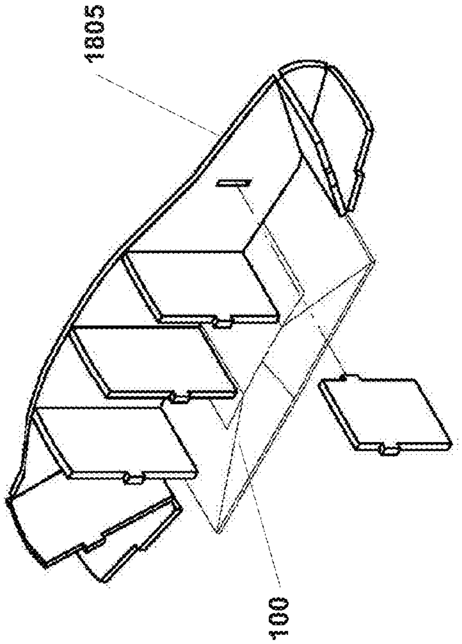
FIG. 19 is a side perspective of the example Soft CP soft body and system partially assembled, according to certain example embodiments with the outermost fabric skin removed, mounted to a DME.
Figure 22A:
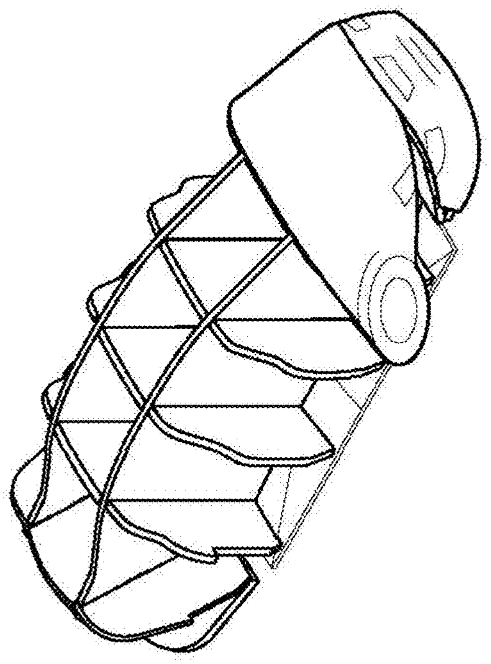
FIG. 22A is a front perspective view of the example Soft CP soft body and system of FIGS. 16-21 fully assembled with the outermost fabric skin partially peeled back.
Figure 22B:
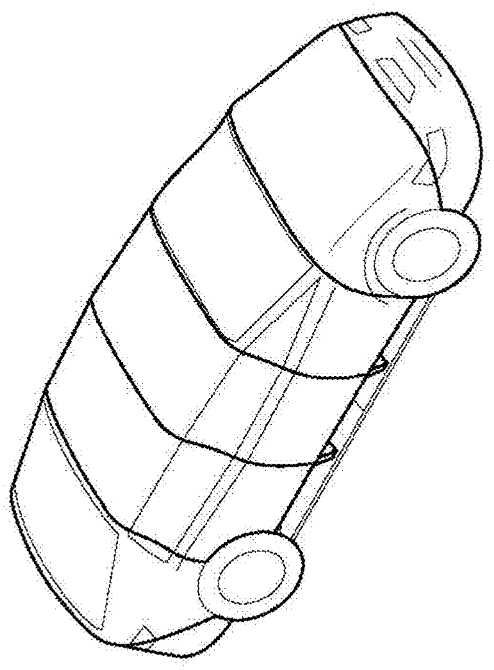
FIG. 22B is a front perspective view of the example Soft CP soft body and system of FIGS. 16-21 fully assembled with the outermost fabric skin completely installed.
Figure 23:
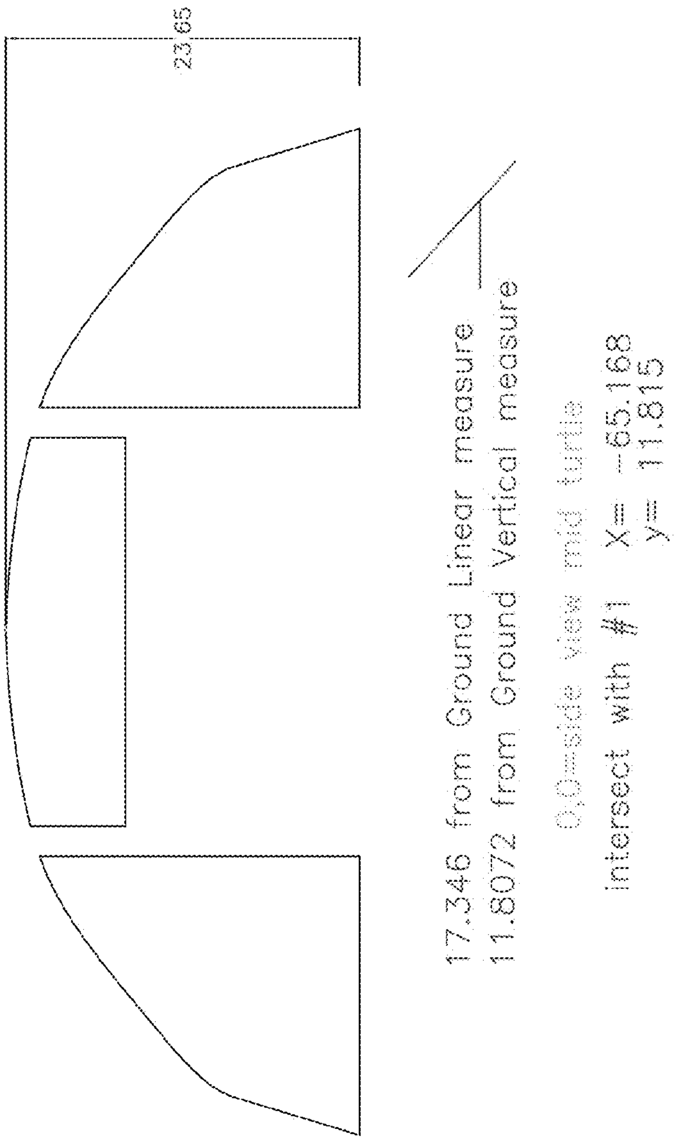
FIG. 23 is a top plan view of example panels of the example Soft CP soft body and system of FIG. 22, showing dimensions for certain example embodiments.
Figure 24:
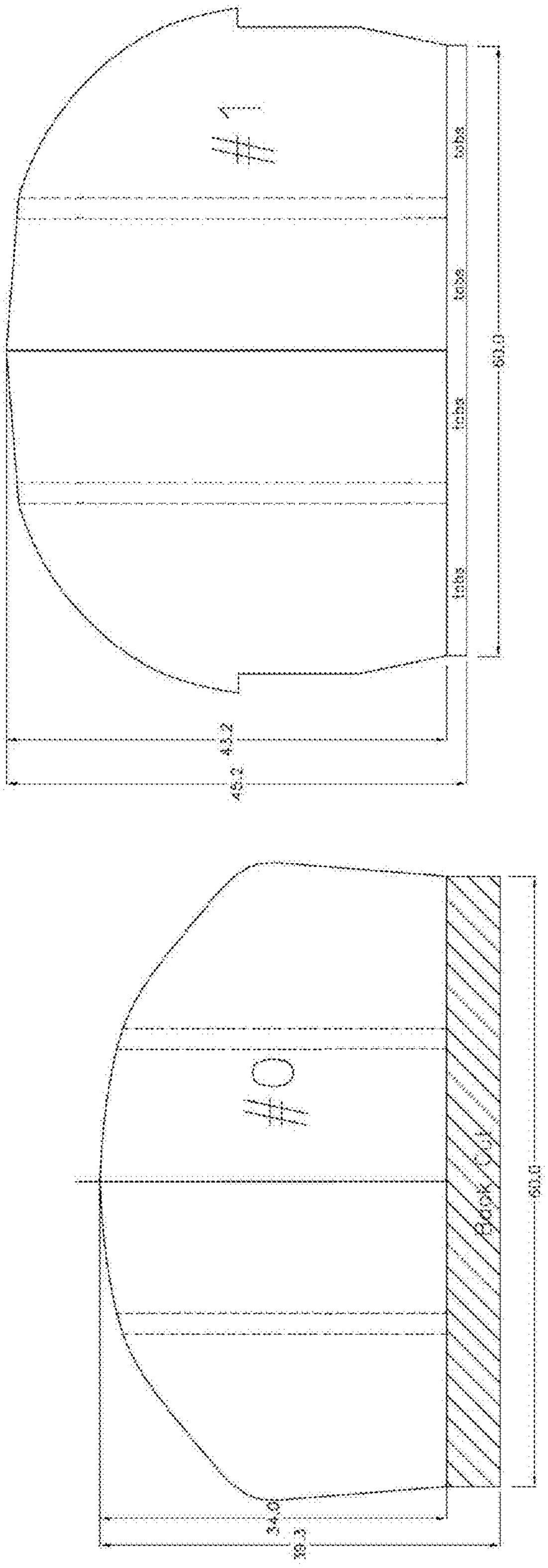
FIG. 24 is a top plan view of example panel numbers 0 and 1 of the example Soft CP soft body and system of FIG. 22A, showing dimensions for certain example embodiments.
Figure 25:
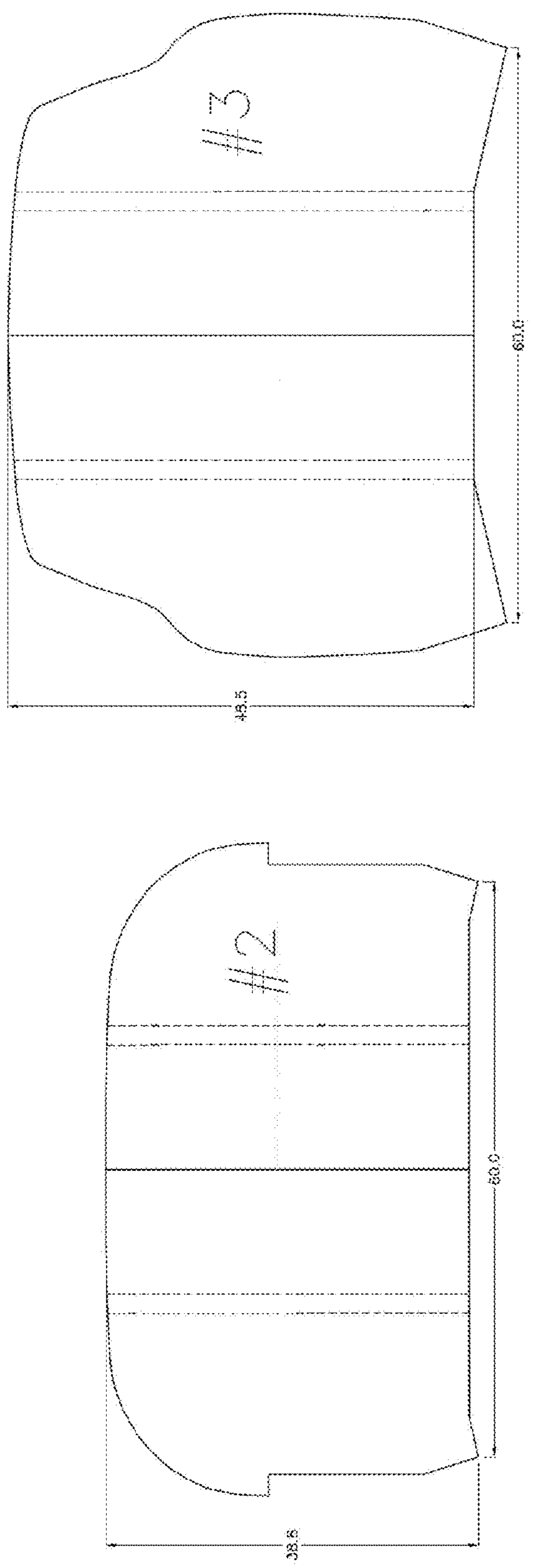
FIG. 25 is a top plan view of example panel numbers 2 and 3 of the example Soft CP soft body and system of FIG. 22A, showing dimensions for certain example embodiments.
Figure 26:
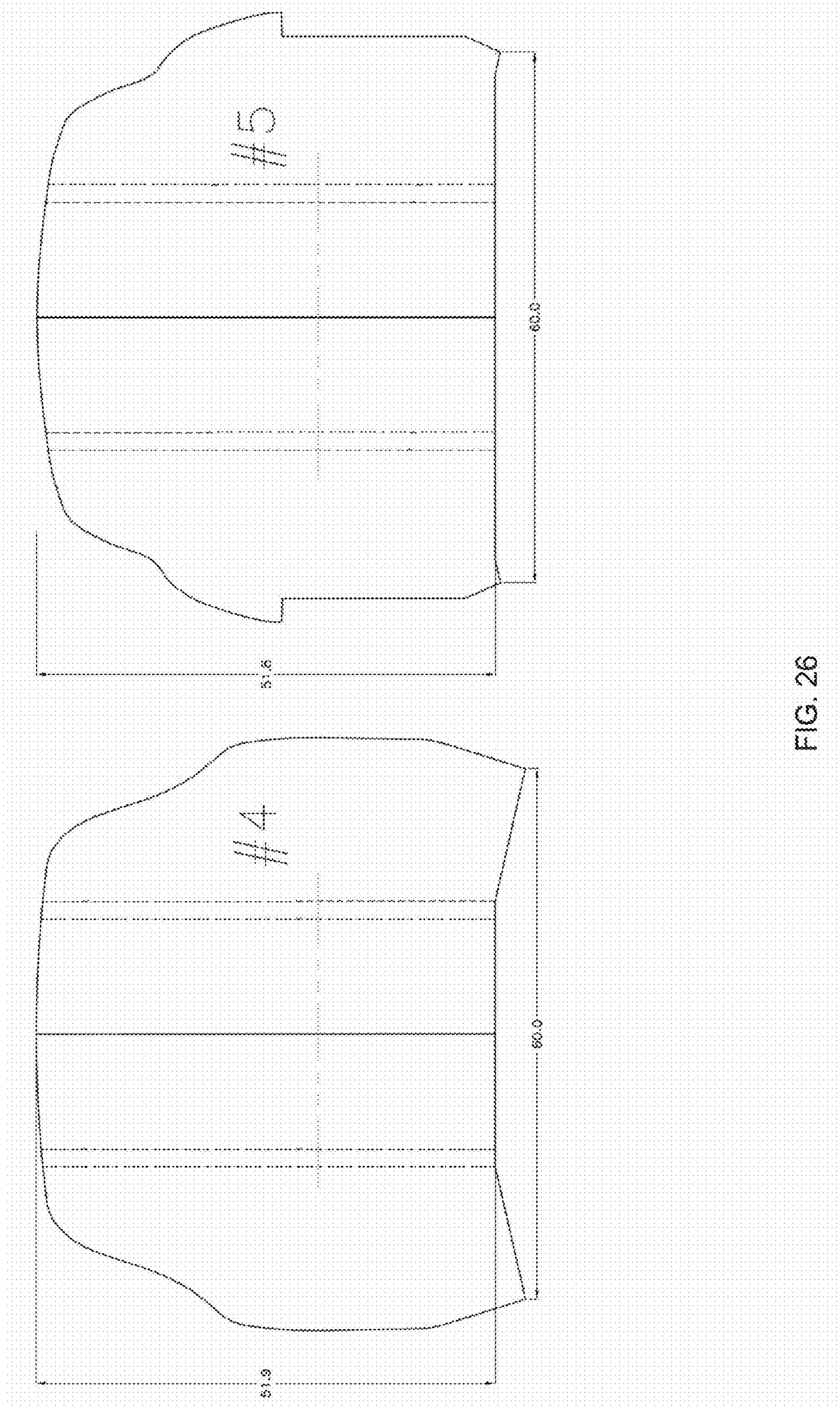
FIG. 26 is a top plan view of example panel numbers 4 and 5 of the example Soft CP soft body and system of FIG. 22A, showing dimensions for certain example embodiments.
Figure 27:
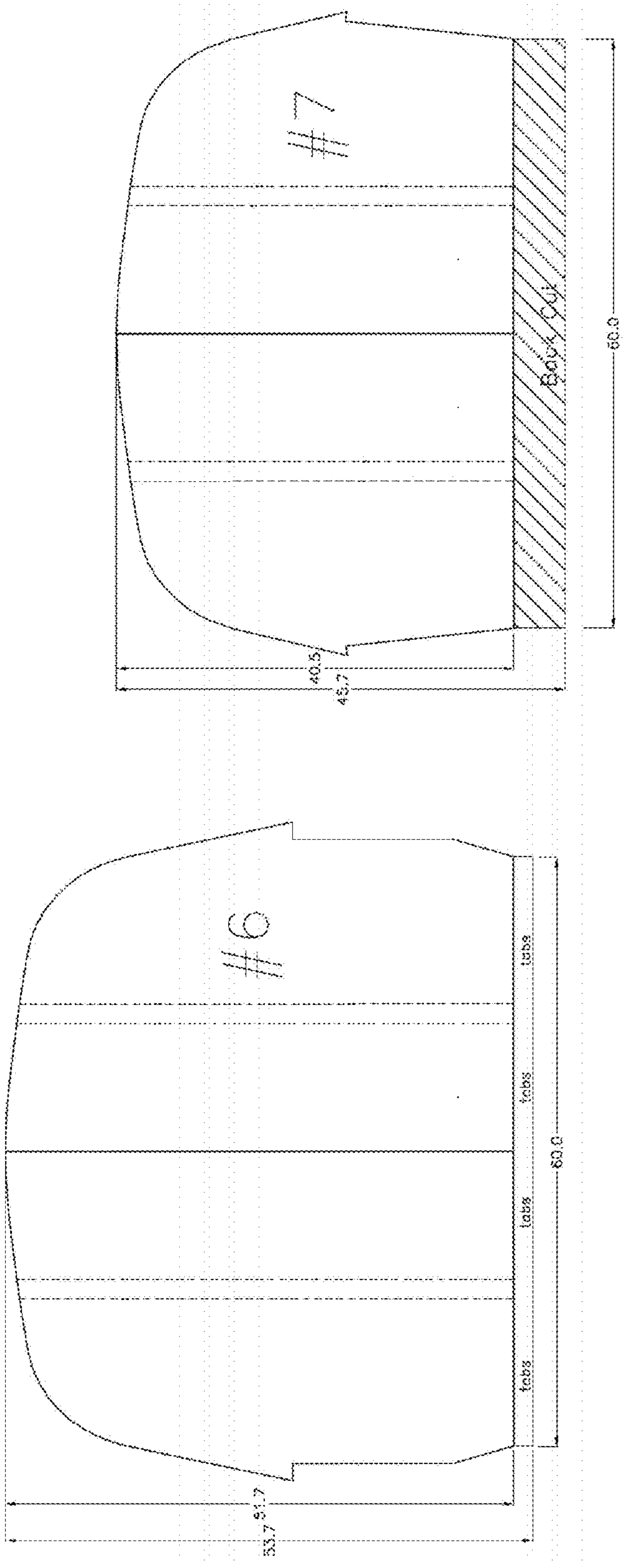
FIG. 27 is a top plan view of example panel numbers 6 and 7 of the example Soft CP soft body and system of FIG. 22A, showing dimensions for certain example embodiments.
Figure 28:
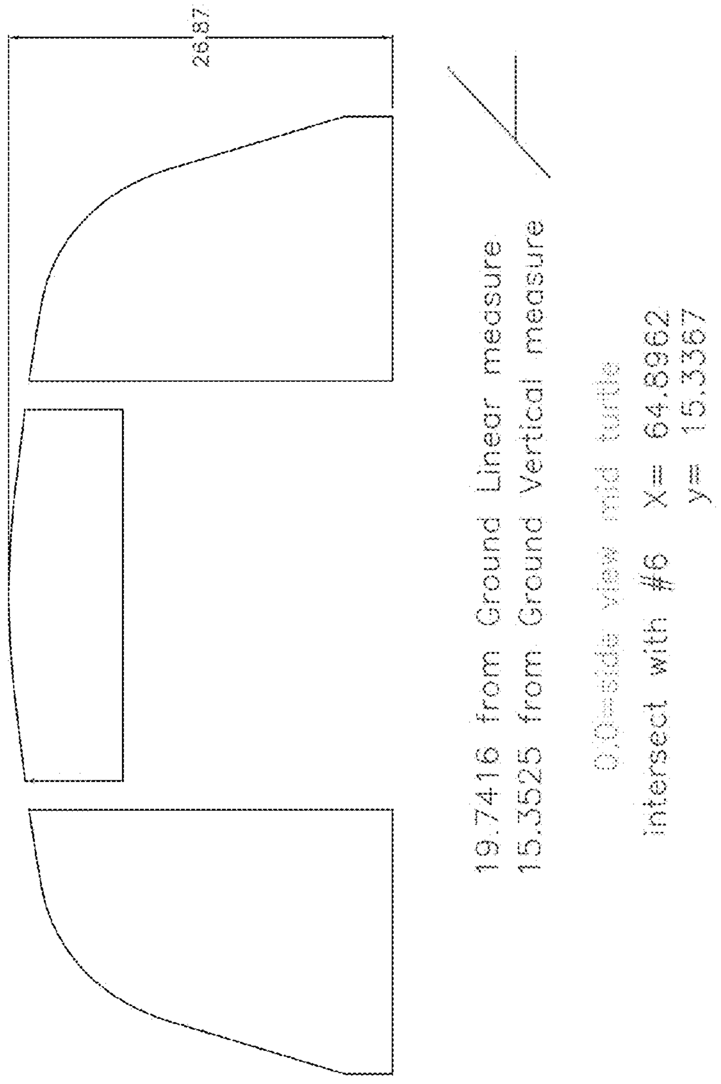
FIG. 28 is a top plan view of example panels of the example Soft CP soft body and system of FIG. 22A, showing dimensions for certain example embodiments.

Referring to FIG. 18, all the panels (Nos. 0 through 7) shown in FIGS. 23 through 29, are shown in exploded view so that it is easy to visualize the installations. Also shown in FIG. 18, are two longitudinally-extending bulkhead panels 1805 which may be placed vertically atop the DME 100 or otherwise adjacent a desired structure. FIGS. 19 through 22B illustrate the assembly of the Soft CP. In FIG. 19 one or more transversely-extending bulkhead panels may be placed vertically atop the DME 100 or otherwise adjacent a desired structure, and removably connected with the longitudinally-extending bulkhead panels 1805 forming a framework with self-supporting structural rigidity, as shown in FIG. 20. FIG. 21 depicts adding additional panels that help define the outer profile of the Soft CP, by removably connecting the additional panels with the longitudinally-extending and/or transversely-extending bulkhead panels. These additional panels may be positioned in substantially vertical, horizontal or inclined planes, such as shown in FIG. 21. Then as shown in FIG. 22A, a fabric skin or fabric-wrapped foam skin may be positioned around the outer profile of the panels described above, and removably connected thereto. In FIG. 22B the outer fabric skin or fabric-wrapped foam skin has been fully installed and covers the internal panel network. All the removable connections may be constructed and used as shown in FIGS. 30 and/or 31, or using any other suitable structure that allows the panels and fabric to separate when impacted by a subject vehicle, and then be easily re-assembled as shown in FIGS. 19 through 22B.

Figure 32:
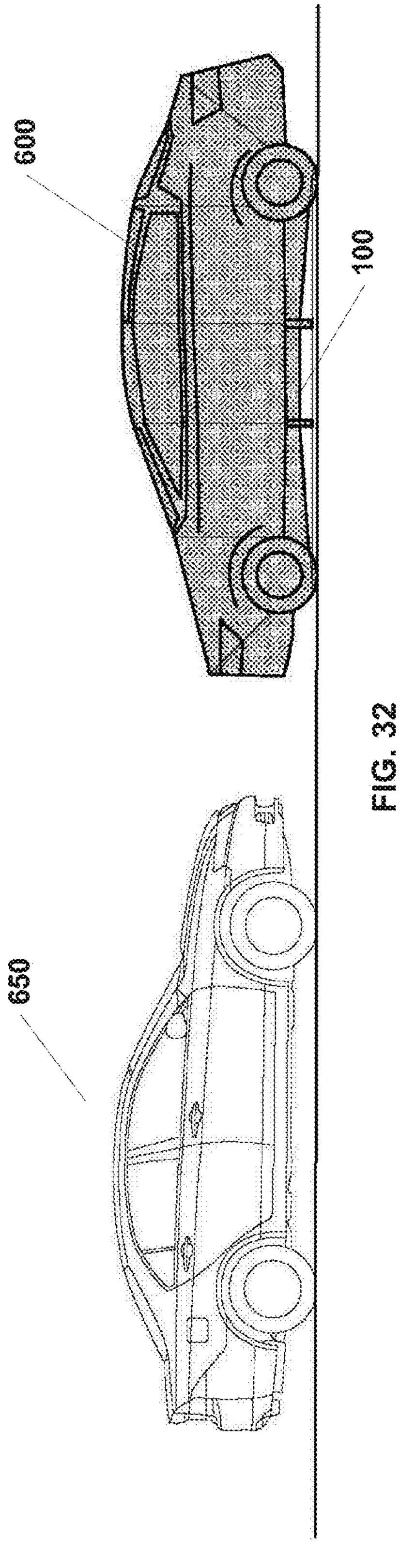
FIG. 32 is a side elevation view of the example Soft CP soft body and system of FIG. 22A fully assembled atop a DME according to certain example embodiments, shown in use and about to be impacted from the front by an example subject vehicle according to certain example embodiments.
Figure 33:
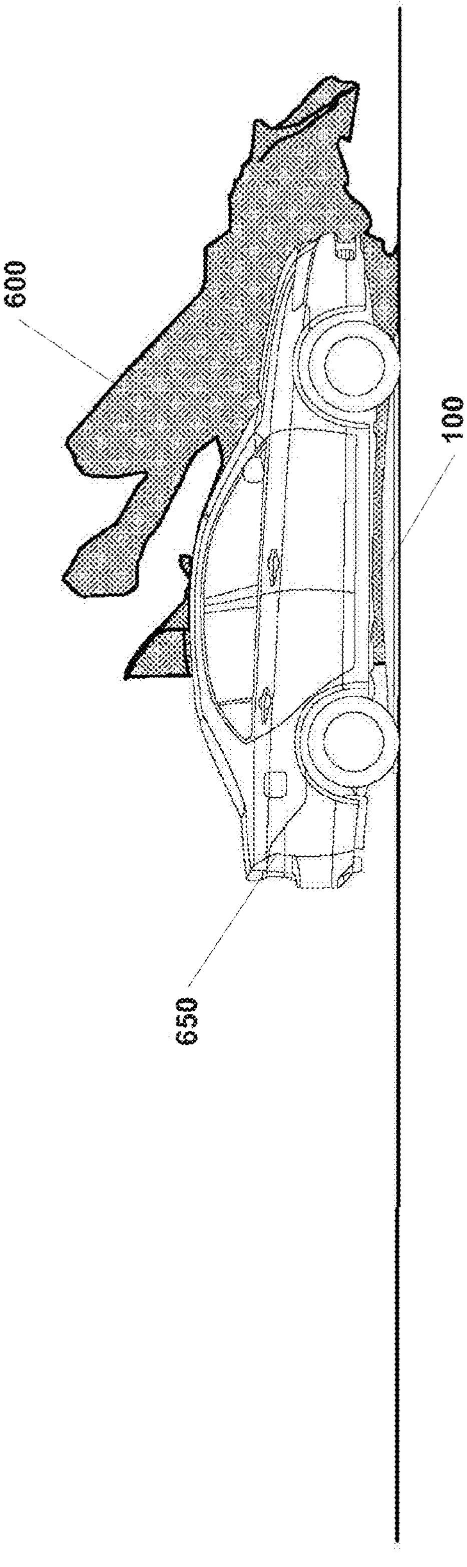
FIG. 33 is a side elevation view of the example Soft CP soft body and system of FIG. 22A, shown in use while being impacted from the front by an example subject vehicle according to certain example embodiments.

FIGS. 32 through 35 show the example embodiments of FIGS. 16 through 29 in use. In FIG. 32, a subject vehicle 650 approaches from the left to the right, while the example Soft CP 600, mounted atop a DME 100, approaches from the right to the left. The subject vehicle 650 and the Soft CP 600 are headed for a head-on, front-end to front-end collision. FIG. 33 shows what happens next: the front of the subject vehicle 650 crashes into the front of the example Soft CP 600, and various panels of the Soft CP 600 separate from each other, allowing at least a portion of the subject vehicle to drive straight through at least a portion of the Soft CP 600 and, in this example, directly over the top of at least a portion of the DME 100.

Figure 34:
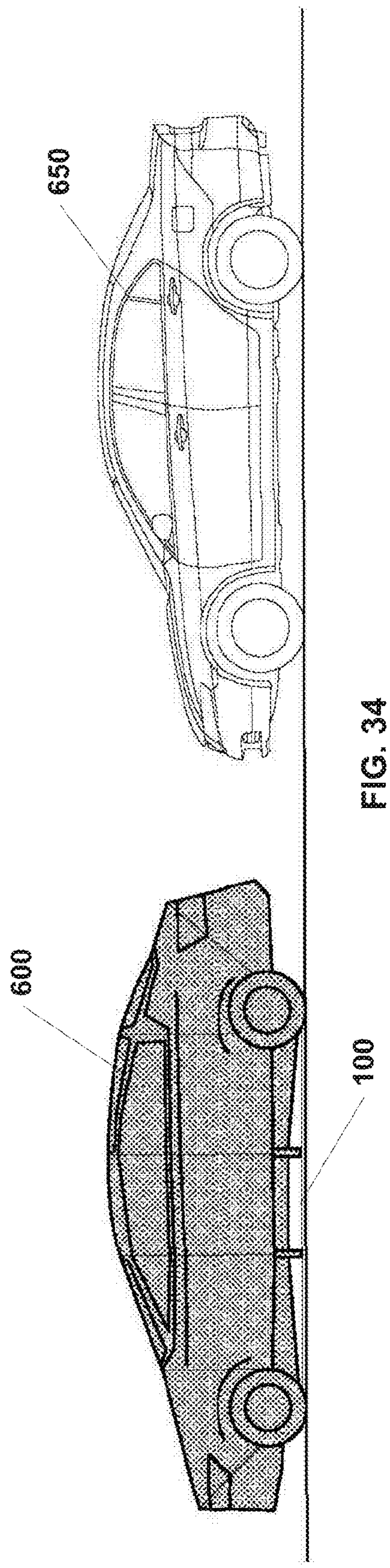
FIG. 34 is a side elevation view of the example Soft CP soft body and system of FIG. 22A fully assembled atop a DME according to certain example embodiments, shown in use and about to be impacted from the rear by an example subject vehicle according to certain example embodiments.
Figure 35:
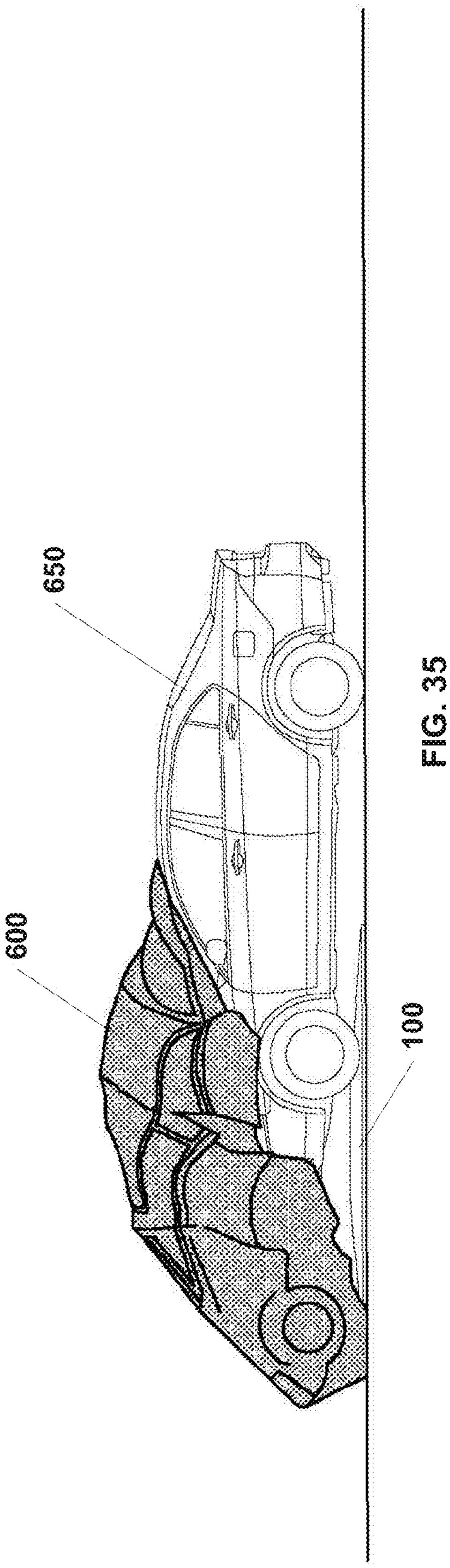
FIG. 35 is a side elevation view of the example Soft CP soft body and system of FIG. 22A, shown in use while being impacted from the rear by an example subject vehicle according to certain example embodiments.

In FIG. 34, a subject vehicle 650 approaches from the right to the left, while the example Soft CP 600, mounted atop a DME 100, also approaches from the right to the left, but at a slower speed or stopped. The subject vehicle 650 and the Soft CP 600 are headed for a front-end to rear-end collision. FIG. 35 shows what happens next: the front of the subject vehicle 650 crashes into the rear of the example Soft CP 600, and various panels of the Soft CP 600 separate from each other, allowing at least a portion of the subject vehicle 650 to drive straight through at least a portion of the Soft CP 600 and, in this example, directly over the top of at least a portion of the DME 100.

This new and improved Soft CP, system and method provides an inexpensive and easy to assemble structure capable of closely simulating the rigid appearance and radar and other sensor signatures of items such as a motor vehicle, a pedestrian, or other object, while providing a safe and easily reusable target for high-speed subject vehicles used to evaluate crash avoidance technologies. Example Soft CP's designed, manufactured and assembled according to the present invention can handle impacts such as those shown in FIGS. 33 and 35 at relative speeds over 110 kilometers per hour without damage to the subject vehicle 650. The interlocking internal structure of the Soft CP's as shown in FIGS. 33 and 35 provides sufficient support to make the Soft CP's aerodynamically stable, limiting or eliminating aerodynamic flutter. The present Soft CP's can be easily made to resemble the simulated item from all directions, allowing the subject vehicle 650 to approach from any angle while generating accurate data. The Soft CP's may be calibrated against real vehicles or pedestrians in regard to their radar or other sensor signatures. Instead of remaining in one piece that needs to be pushed out of the way, the present Soft CP's reduce impact forces by breaking apart into separate, light-weight, easily-to-reassemble panels, as shown in FIGS. 18 through 21. The present Soft CP's may be adapted for use atop low-profile drive systems that are driven-over by the subject vehicle 650 as shown in FIGS. 33 and 35, instead of pushed out of the way by the subject vehicle 650. After the impacts, for instance as shown in FIGS. 33 and 35, the panels may be quickly and easily reassembled as shown in FIGS. 18 through 21.

Instead of a soft car as shown in FIGS. 16 through 35, any other shape may be attached to a DME 100 to form a GST, such as a pedestrian shape Soft CP, or a Soft CP of any other useful shape.

6.8 Example System Architectures and Functions

Figure 8:
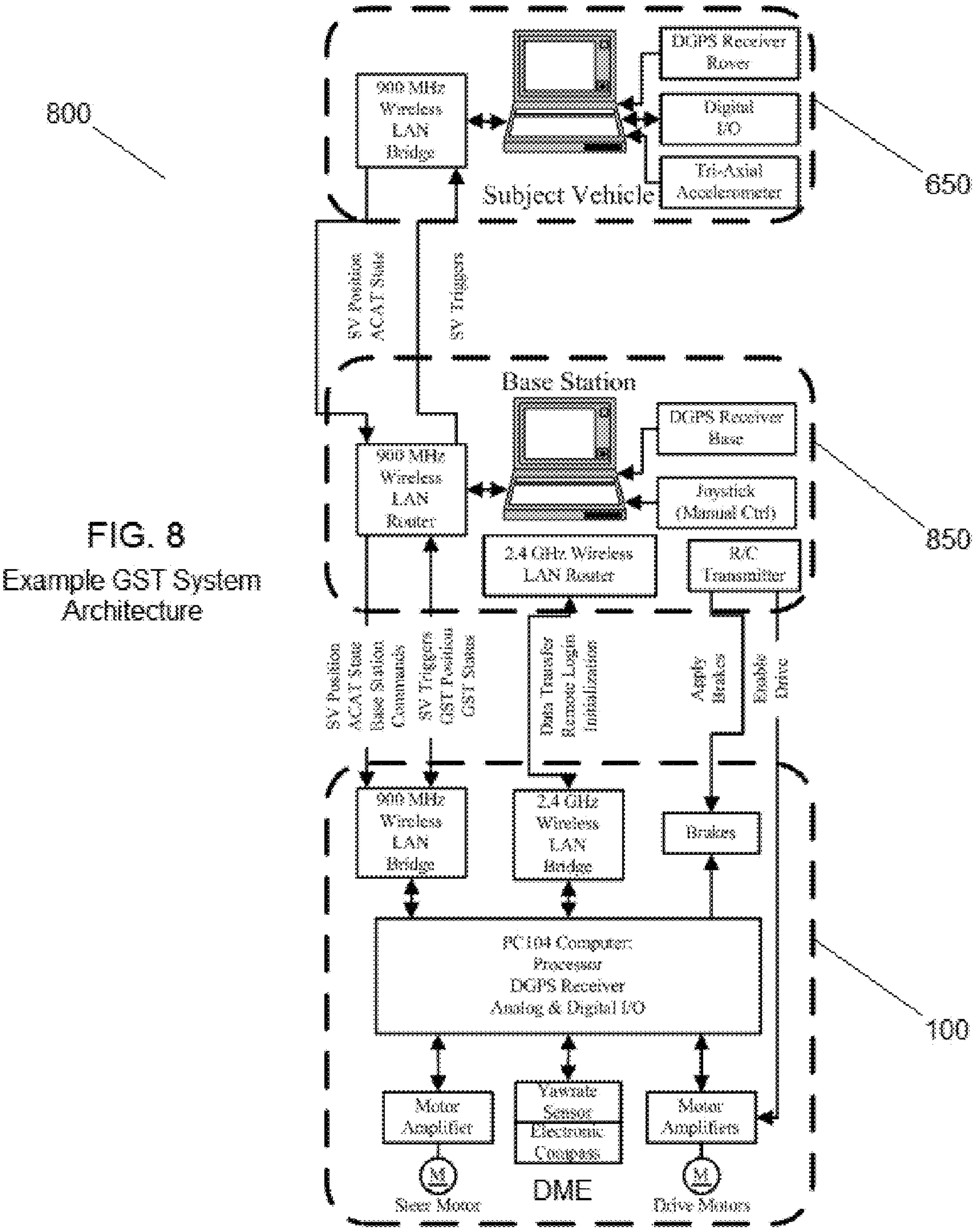
FIG. 8 is a diagram showing certain elements of an example GST system architecture according to various example embodiments.

GST systems in various example embodiments may comprise, for instance, a plurality of computers that communicate, for instance via a Wireless Local Area Network (WLAN), and perform various functions. FIG. 8 illustrates the overall architectural layout of an example GST system 800, which may include the following nodes and their associated peripheral equipment, for example: a subject vehicle 650; base station 850; and DME 100.

The computer associated with the subject vehicle 650 may perform the various data I/O functions within the subject vehicle 650, and provide the measured data to the rest of the system. Additionally, the subject computer may control discrete events within the subject vehicle 650. The subject vehicle 650 node may comprise the following components, for example: notebook computer; differential GPS receiver; tri-axial accelerometer; digital I/O board to monitor and control discrete events (e.g., sense ACAT warning on/off, illuminate LEDs, initiate open-loop braking, provide audible alerts); and wireless LAN bridge, for instance.

The base station 850 may act as the central hub for all communications and allow the operator to monitor and control the system. The base station 850 may comprise the following components, for example: Differential GPS (DGPS) base station receiver; notebook computer; joystick; wireless LAN router; and radio transmitter to provide emergency-stop capability, for instance.

The computer associated with the base station 850 may allow the system operator to run a complete suite of tests from a single location. From the computer associated with the base station 850, the operator may perform the following functions, for example: setup and configuration of subject vehicle 650 and GST computers via remote connection; monitor subject vehicle 650 and GST positions, speeds, system health information and other system information; setup of test configuration; test coordination; post-test data analysis; and selection of GST modes, including, for example: hold; manual; semi-autonomous; and fully autonomous, for instance.

The DGPS receiver in the base station 850 may provide corrections to the roving DGPS receivers in both the DME 100 and the subject vehicle 650 via a WLAN or other communications network. This may be accomplished without the need for a separate DGPS radio modem, minimizing the number of antennas on each node of the system. This may be important in the case of the DME 100, since all connections to antennas are typically made frangible, such that they can separate from the DME 100 in the event of a collision with the subject vehicle 650.

Example DME 100 subsystems may comprise the following components, among others, for instance: wireless LAN bridge; PC104 computer; yaw rate sensor; electronic compass; two brushless DC drive motors and amplifiers; a brushless DC steering motor and amplifier; brake system; RF emergency brake system; DGPS receiver; a DME computer such as a PC104 computer that performs functions such as the following example functions: Guidance, Navigation and Control (GNC) computations; analog and digital data input and output; inputs, including: differential GPS information; electronic compass (heading angle); yaw rate; drive motor speed; steering angle; drive motor amplifier temperature; drive motor winding temperature; and outputs, including: drive motor torque command; steer motor angle command; brake command; system health monitoring; and data collection, for instance. Other or fewer components may be used in various example embodiments.

6.9 Multiple-Frequency Data Transmission

As shown in the example network and system depicted in FIG. 8, two or more separate communication systems may be provided between the DME 100 and the operator's station 850. In one example embodiment, a first communication system may use, for example, a 900 MHz, 1 W wireless LAN to provide critical real-time data transfer between the subject vehicle 650 and the DME 100 over longer ranges. A second communication system may use, for example, a 2.4 GHz (802.11b\g), 500 mW high-speed wireless LAN for large data file transfers and setup/configuration of the DME 100 over short distances, for instance prior to the start of a test. Additional communication systems may be provided, such as radio wave band systems for remote control signals. Increasing the transmission power will further increase the communication range. The example embodiment shown in FIG. 8 may increase the communication range over which the system can operate to approximately 1 km, whereas typical prior art systems would lose communication at approximately 250 m.

It is critical that data packets not be lost during a test in order to maintain coordination between the DME 100 and the subject vehicle 650. Separation of critical and non-critical data into two separate communication systems improves the reliability and performance of the critical data transmissions, reducing data packet losses. Separation of data into multiple separate communication systems further allows the systems to avoid interference-prone frequencies for certain tasks. For example, interference has been noted between 2.4 GHz transmissions and GPS antennas. Use of 900 MHz for critical real-time data eliminates this as a concern for testing.

Certain frequencies are also better suited for certain tasks. For example, 900 MHz data is best used for low-speed, long-range communications. This data is typically data that is required during the test, where the data must be received in real-time and is used in real-time for control or mode transitions. For instance, subject vehicle position may be communicated at 900 MHz for real-time synchronization of the DME 100 with position of the subject vehicle 650. ACAT State may also be communicated at 900 MHz to trigger the end of the synchronization mode such that the DME 100 will not react to the changes in the trajectory of the subject vehicle 650 caused by the ACAT response. Base Station Commands may also be communicated at 900 MHz to change the state of the DME 100, for example from "Run" to "Hold." Subject vehicle triggers may be communicated at 900 MHz to allow data synchronization between the DME 100, the subject vehicle 650, and any additional data recording devices. Additionally, DME Position and Status may be communicated at 900 MHz so the operator of the system 800 can monitor in real-time the operation of the DME 100. While 900 MHz is used as an example frequency, it is understood that any similarly-functioning frequency may be used for these and similar tasks without departing from the spirit and scope of the invention.

In contrast, 2.4 GHz data is better suited for high speed, short range communications, such as potentially massively large data transfers occurring before or after a run. Sending such large amounts of data over a slower network would require significantly more time, sometimes hours. Accordingly, initialization data may be communicated at 2.4 GHz to transfer the parameter initialization file(s) and the trajectory file(s), which may define the run and operational parameters of the DME 100, but do not change during operation. Likewise, remote login data may be communicated at 2.4 GHz to remotely login to the computer in the DME 100 in order to start the required software during start-up. Transfer of recorded data may also be suitable for communication at 2.4 GHz to transfer large data files that have been recorded on the computer in the DME 100. The transfer of such files would typically occur after the completion of one or more tests. While 2.4 GHz is used as an example frequency, it is understood that any similarly-functioning frequency may be used for these and similar tasks without departing from the spirit and scope of the invention.

6.10 Method of GST Operation

Prior to testing, paired time-space trajectories for the subject vehicle 650 and GST (e.g., a soft body 600, 700, mounted on a DME 100) may be generated. These trajectories should be physics-based, and either can be hypothetical or reconstructed real-world crash scenarios. Trajectories can be specified to result in any manner of collision between the subject vehicle 650 and GST, and can include variations in speed and path curvature for both the subject vehicle 650 and GST. The spatial trajectories may be stored in files which also include subject vehicle 650 and GST speeds along their respective paths, and scenario-specific discrete events. These discrete events (e.g., point of brake application) can be used to control the timing of events in the subject vehicle 650 at known points along the subject vehicle 650 path. These can be used to initiate open-loop braking, illuminate LEDs, or provide audible alerts within the subject vehicle 650, for example.

In various embodiments a GST system 800 may have, for instance, four different modes of operation: hold; manual; semi-autonomous; and fully-autonomous. The Hold Mode is the "idle" mode for the GST system. In this mode, the output signals to the steering and drive motors may be nullified, but the GUI for the base station 850 may continue to show data from the GST and subject vehicle 650 sensors. Whenever the GST is switched into this mode from one of the "active" modes (e.g., Manual, Semi-Autonomous or Fully Autonomous), data that was collected during the active mode may be transferred wirelessly to the computer associated with the base station 850 for further analysis.

The Manual Mode may be completely human-controlled via a joystick associated with the base station 850. In this mode, the operator may have remote control over the speed and steering of the GST. This mode may be useful in pre-positioning the GST or for returning it to base for charging the batteries, routine service, or for shutting down the system.

The Semi-Autonomous Mode allows the operator of the base station 850 to control the speed of the GST while the path following may be accomplished autonomously. This may be especially useful for pre-positioning the GST before a given test run, since the GST can be driven starting from any point on the test surface, and it will seek and converge on the desired path. The path-following GNC algorithm also may allow for operation in reverse, allowing the operator to drive the GST in reverse along the path for fast repetition of tests.

The Fully Autonomous Mode may require no further inputs from the base station 850. In this mode, the subject vehicle 650 may be driven along the subject vehicle 650 path, and the GST computes the speed and steering inputs necessary to move along its own path in coordination with the subject vehicle 650, as determined by the pre-programmed trajectory pair. In this way, the longitudinal position of the GST may be driven by the longitudinal position of the subject vehicle 650 such that the GST arrives at the pre-determined collision point at the same moment as the subject vehicle 650, even accommodating errors in the speed of the subject vehicle 650 (relative to the speed in the trajectory file) as it approaches by adjusting its own speed. As an option, the test engineer can enable a sub-mode in which, if the subject vehicle 650 driver or ACAT system begins to react to the impending collision, the GST speed command may be switched to the speed contained in the trajectory file such that it is no longer dependent upon the speed of the subject vehicle 650. The switch to this sub-mode may be made automatically (mid-run) when the subject vehicle 650 acceleration exceeds a predetermined threshold (e.g., 0.3 g) or when subject vehicle 650 ACAT system activation may be sensed via a discrete input. In this way, the GST passes through the would-be collision point at the speed prescribed in the trajectory file, irrespective of the position or speed of the subject vehicle 650.

6.11 Testing with the GST

During test setup, the paired time-space trajectories may be wirelessly loaded into the DME 100 on-board processor from the base station 850, and the GST may be placed into the fully autonomous mode. As the subject vehicle 650 begins to travel along its path, its position (as measured by differential GPS) may be transmitted wirelessly to the DME 100 processor, which may be programmed to accomplish lateral and longitudinal control to obtain the desired relative closed-loop trajectories. A given test run can culminate in a collision between the subject vehicle 650 and the GST, as shown in FIG. 6D, in which case, the GST may be brought to a stop using a radio transmitter, separate from the WLAN, which can actuate the onboard brakes of the GST, and disable the drive motors. Test data may be automatically transmitted wirelessly from the DME 100 to the computer associated with the base station 850 once the operator transitions from the Fully Autonomous mode to the Hold mode. The Soft Collision Partner 600 can then be reassembled on the DME 100, usually within 10 minutes with a crew of two, and the GST can then be repositioned for the next run.

The GST may employ high-performance and high-efficiency components, allowing it to reach relatively high speeds and achieve high positional accuracy along its trajectory, both laterally and longitudinally. Brushless DC drive motors efficiently deliver high power from a small package, and a Differential GPS receiver provides high positional accuracy. The GNC algorithm is able to utilize the capabilities of these sensors and actuators to maximize the utility of the test methodology.

6.12 Results

A complete listing of GST performance specifications of example embodiments disclosed herein is shown below in Table 1.

TABLE 1

Example GST Performance Specifications

| Specification | Value |
|---|---|
| DGPS positional accuracy | 1 cm (depending on DGPS receiver) |
| DME waypoint accuracy | Lateral: 300 mm<br>Longitudinal: 300 mm |
| DME top speed (alone) | 80 km/h |
| DME + Soft Car speed | >55 km/h (demonstrated) |
| Maximum closing speed at impact | 110 km/h (demonstrated) |
| Longitudinal acceleration | ±0.3 g |
| Longitudinal deceleration under braking | −0.6 g |
| Lateral acceleration | ±0.3 g |
| Distance traveled per battery charge | 4 km at 40 km/h (theoretical) |
| Remote control range | 0.5 km |
| Drive motor performance | 2 brushless DC drive motors, totaling:<br>30 kW peak<br>6 kW continuous |
| Bus voltage | 200 VDC |
| Turning radius | <3 m |
| Visibility with Soft Car body, daylight | >0.5 km |
| Battery charge time | 30-40 min (for full charge of depleted batteries) |
| Soft Car reassembly time | 10 minutes |

The GST System 800 is a fully-functional and proven system for evaluating ACATs throughout the entire pre-conflict and conflict scenario up to the time of collision. By enabling the ACAT to be evaluated up to the time of collision, the GST System 800 allows the mitigation capabilities of ACATs to be evaluated in a way that cannot be achieved via testing that does not involve actual collisions. Additionally, the DME 100 allows the evaluation of ACATs in conflict scenarios where the Soft CP is not static. The full-sized Soft Collision Partner 600 allows evaluations of the ACAT in any crash configuration without requiring specific soft targets 600 for each configuration (e.g., rear-end soft targets).

As one example, the GST System 800 was used in the evaluation of a prototype Advanced Collision Mitigation Braking System. The system 800 may be designed to alert the driver in the event of a likely collision and to mitigate the collision severity through automatic application of the brakes for imminent collisions. The test matrix for this evaluation consisted of thirty-three unique crash scenarios, representing four different crash types, repeated with and without the ACAT active. The crash types involved were: Pedestrian; Rear end; Head-on; and Crossing path. During the course of testing, the GST was struck or run over by the subject vehicle 650 more than sixty-five times without being damaged or causing damage to the subject vehicle 650.

By repeating the same conflict scenario with and without the ACAT active, the evaluation methodology allows the evaluator to determine both the reduction in number of collisions due to the ACAT and the reduction in collision severity (i.e., closing speed, contact points, relative heading angle) when a collision occurs. Evaluation of the reduction in collision severity can be achieved because the subject vehicle 650 and the GST positions and speeds may be continuously recorded with high precision. Additionally, a more rigorous analysis of the collision severity in a given test can be achieved by determining the predicted collision delta-V (change in velocity) for each test by using a multi-body crash simulation tool.

As will be apparent to persons skilled in the art, modifications and adaptations to the above-described example embodiments of the invention can be made without departing from the spirit and scope of the invention, which is defined only by the following claims.

The invention claimed is:

1. A retractable antenna system adapted for use with a Dynamic Motion Element of a Guided Soft Target, comprising:

a Dynamic Motion Element having a body with an interior region and an upper exterior surface defining an aperture therein;

a platform retractably mounted to the body, the platform biased toward the aperture and retractable into the interior region when a force directed toward the interior region is applied to the platform;

an antenna mounted to platform and extending above the upper exterior surface when the platform is not retracted into the interior region, the antenna retracting through the aperture and at least substantially into the interior region when the platform is retracted into the interior region.

2. The retractable antenna system of claim 1, wherein the platform is biased toward the aperture with at least one spring.

3. The retractable antenna system of claim 1, wherein the platform has a first side and a second side opposite the first side, the first side is connected to the body with a hinge, and the platform retracts into the interior region by rotating about the hinge.

4. The retractable antenna system of claim 3, wherein the platform is biased toward the aperture with at least one torsional spring.

5. The retractable antenna system of claim 1, further comprising:

the platform having a first side and a second side opposite the first side; and a frame having a body with a first side and a second side opposite the first side and defining an opening therebetween through which at least a portion of the platform passes when the platform is retracted into the interior region;

wherein the first side of the platform is connected by a first hinge to the first side of the frame, and the second side of the frame is connected by a second hinge to the body, and the platform retracts into the interior region by rotating about the first and/or second hinges.

6. The retractable antenna system of claim 5, wherein the platform is biased toward the aperture with at least one spring.

7. The retractable antenna system of claim 6, wherein the frame is biased toward the aperture with at least one spring.

8. The retractable antenna system of claim 6, wherein the at least one spring comprises a torsional spring.

9. The retractable antenna system of claim 7, wherein the at least one spring comprises a torsional spring.

10. The retractable antenna system of claim 5, wherein the platform is biased toward the aperture with at least one torsional spring and the frame is biased toward the aperture with at least one torsional spring.

11. The retractable antenna system of claim 1, wherein the antenna comprises a GPS antenna.

12. The retractable antenna system of claim 5, wherein the antenna comprises a GPS antenna.

13. The retractable antenna system of claim 1, wherein the platform's upward movement is limited by the platform contacting the body.

14. The retractable antenna system of claim 3, wherein the platform's upward movement is limited by the second side of the platform contacting the body.

15. The retractable antenna system of claim 1, further comprising a soft body removably attached to the Dynamic Motion Element.

16. A method of using a Guided Soft Target, comprising the steps of:

providing a Guided Soft Target comprising Dynamic Motion Element that comprises a retractable antenna, the retractable antenna system comprising:

the Dynamic Motion Element having a body with an interior region and an upper exterior surface defining an aperture therein;

a platform retractably mounted to the body, the platform biased toward the aperture and retractable into the interior region when a force directed toward the interior region is applied to the platform;

an antenna mounted to platform and extending above the upper exterior surface when the platform is not retracted into the interior region, the antenna retracting through the aperture and at least substantially into the interior region when the platform is retracted into the interior region;

causing a subject vehicle to drive over the top of at least a portion of the Dynamic Motion Element and over the top of at least a portion of the antenna and thereby causing the antenna to retract into the interior region.

17. The method of claim 16, wherein the Guided Soft Target further comprises a soft body removably attached to the Dynamic Motion Element, and wherein the step of causing a subject vehicle to drive over the top of at least a portion of the Dynamic Motion Element further comprises causing the subject vehicle to impact the soft body and at least partially remove the soft body from the Dynamic Motion Element.

18. The method of claim 16, wherein the retractable antenna system further comprises:

the platform having a first side and a second side opposite the first side; and a frame having a body with a first side and a second side opposite the first side and defining an opening therebetween through which at least a portion of the platform passes when the platform is retracted into the interior region, wherein the first side of the platform is connected by a first hinge to the first side of the frame, and the second side of the frame is connected by a second hinge to the body, and the platform retracts into the interior region by rotating about the first and/or second hinges;

wherein the step of causing a subject vehicle to drive over the top of at least a portion of the Dynamic Motion Element further comprises causing the antenna to retract into the interior region by rotating the platform about the first and/or second hinges.

19. The method of claim 16, further comprising repeating more than once the step of: causing a subject vehicle to drive over the top of at least a portion of the Dynamic Motion Element and over the top of at least a portion of the antenna and thereby causing the antenna to retract into the interior region; wherein the retractable antenna system is not damaged.

20. The method of claim 18, further comprising repeating more than once the step of: causing a subject vehicle to drive over the top of at least a portion of the Dynamic Motion Element and over the top of at least a portion of the antenna and thereby causing the antenna to retract into the interior region; wherein the retractable antenna system is not damaged.

* * * * *